(12) United States Patent
Takagi

(10) Patent No.: US 7,756,955 B2
(45) Date of Patent: Jul. 13, 2010

(54) INFORMATION PROCESSING APPARATUS, INFORMATION PROCESSING METHOD, AND PROGRAM THEREOF

(75) Inventor: Yoshihiro Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 11/554,692

(22) Filed: Oct. 31, 2006

(65) Prior Publication Data

US 2007/0101345 A1    May 3, 2007

(30) Foreign Application Priority Data

Nov. 2, 2005   (JP)   ............................. 2005-320010

(51) Int. Cl.
  G06F 15/177   (2006.01)
  H04L 9/32   (2006.01)
  G06F 9/445   (2006.01)
  G06F 3/00   (2006.01)
  G06F 9/44   (2006.01)
  G06F 9/46   (2006.01)
  G06F 13/00   (2006.01)

(52) U.S. Cl. ...................... 709/221; 709/220; 713/168; 717/174; 717/176; 717/178; 719/321

(58) Field of Classification Search ........................ None

See application file for complete search history.

(56) References Cited

U.S. PATENT DOCUMENTS 5,819,107 A  *  10/1998  Lichtman et al. ............... 710/8

(Continued)

FOREIGN PATENT DOCUMENTS

JP   2002-366502   12/2002

(Continued)

OTHER PUBLICATIONS

"UpnP (TM) Device Architecture" version 1.0, Jun. 8, 2000, (Internet URL: http://www.upnp.org/download/UPnPDA10_20000613.htm).

(Continued)

*Primary Examiner*—Ario Etienne
*Assistant Examiner*—Ho Shiu
(74) *Attorney, Agent, or Firm*—Fitzpatrick, Cella, Harper & Scinto

(57) ABSTRACT

An information processing apparatus connected to a peripheral device, including: a reception unit adapted to receive a network leaving message from the peripheral device; a first determination unit adapted to determine if a device driver corresponding to the peripheral device as a source of the network leaving message received by the reception unit meets a predetermined condition; and an uninstall unit adapted to uninstall the device driver corresponding to the peripheral device as the source of the network leaving message when the first determination unit determines that information of the device driver meets the predetermined condition.

13 Claims, 22 Drawing Sheets

U.S. PATENT DOCUMENTS

| | | | |
|---|---|---|---|
| 7,536,698 B2 * | 5/2009 | Machida | 719/321 |
| 2002/0042911 A1 * | 4/2002 | Harms | 717/173 |
| 2002/0083227 A1 * | 6/2002 | Machida | 710/8 |
| 2002/0174206 A1 * | 11/2002 | Moyer et al. | 709/221 |
| 2004/0003112 A1 | 1/2004 | Alles et al. | 709/237 |
| 2004/0006766 A1 * | 1/2004 | Kim | 717/174 |
| 2004/0060045 A1 * | 3/2004 | Hind et al. | 717/174 |
| 2004/0064458 A1 * | 4/2004 | Hagarty | 707/100 |
| 2004/0177202 A1 * | 9/2004 | Won | 710/302 |
| 2004/0221081 A1 * | 11/2004 | Yao et al. | 710/302 |
| 2004/0249907 A1 | 12/2004 | Brubacher et al. | 709/220 |
| 2004/0250265 A1 * | 12/2004 | Suzuki et al. | 719/321 |
| 2005/0102667 A1 * | 5/2005 | Barta et al. | 717/174 |
| 2006/0031205 A1 * | 2/2006 | Perkins et al. | 707/3 |
| 2006/0044586 A1 | 3/2006 | Kujirai et al. | 358/1.13 |
| 2006/0122848 A1 | 6/2006 | Takagi | 705/1 |
| 2006/0253859 A1 * | 11/2006 | Dai et al. | 719/321 |
| 2006/0258342 A1 * | 11/2006 | Fok et al. | 455/414.1 |
| 2007/0101345 A1 | 5/2007 | Takagi | 719/321 |
| 2007/0124513 A1 | 5/2007 | Kikuchi | 710/8 |
| 2007/0156942 A1 * | 7/2007 | Gough | 710/302 |
| 2008/0082976 A1 * | 4/2008 | Steinwagner et al. | 718/1 |
| 2008/0095359 A1 * | 4/2008 | Schreyer et al. | 380/44 |

FOREIGN PATENT DOCUMENTS

| | | |
|---|---|---|
| JP | 2004-038956 | 2/2004 |
| JP | 2004-280218 | 10/2004 |
| JP | 2004-362594 | 12/2004 |

OTHER PUBLICATIONS

"Web Service Dynamic Discovery (WS-Discovery)", Apr. 2005 (Internet URL: http://specs.xmlsoap.org/ws/2005/04/discovery/ws-discovery.pdf).

"Web Services Metadata Exchange (WS-MetadataExchange)", Aug. 2006 (Internet URL: http://specs.xmlsoap.org/ws/2004/09/mex/ws-metadataexchange.pdf).

* cited by examiner

<s:Envelope ... >
      <a:Header ... >
        <a:Action ... >
            http://schemas.xmlsoap.org/ws/2005/04/discovery/Hello
        </a:Action>
        <a:MessageID ... >xs:anyURI</a:MessageID>
        [<a:RelatesTo RelationshipType="d:Suppression" >
           xs:anyURI
        </aRelatesTo>]?
        <a:To ... >urn:schemas-xmlsoap-org:ws:2005:04:discovery</a:To>
      <d:AppSequence ... />
      ...
      </a:Header>
      <a:Body ... >
        <a:Hello ... >
          <a:EndpointReference> ... </a:EndpointReference>
302 ―――  [<d:Types>list of xs:QName</d:Types>] ?
303 ―――  [<d:Scopes>list of xs:anyURI</d:Scopes>] ?
         [<d:XAddrs>list of xs:anyURI</d:XAddrs>] ?
304 ―――  <d:MetadataVersion>xs:unsignedInt</d:MetadataVersion>
          ...
        </d:Hello>
      </s:Body>
    </s:Envelope>
```

FIG. 4

```
<s12:Envelope
    xmlns:s12="http://www.w3.org/2003/05/soap-ebvelope"
    xmlns:wsa="http://schemas.xmlsoap.org/ws/2004/08/addressing"
    xmlns:wax="http://schemas.xmlsoap.org/ws/2004/09/mex" >
  <s12:Header>
    <wsa:Action>
        http://schemas.xmlsoap.org/ws/2004/09/mex/GetMetadata/Request
    </wsa:Action>
    <wsa:MessageID>
        uuid:a6e37bfb-f324-4e71-b33a-4f6d5c6027f4
    </wsa:MessageID>
    <wsa:ReplyTo>
        <wsa:Address>http://client.example.com/MyEndpoint</was:Address>
    </wsa:ReplyTo>
    <wsa:To>http://server.example.org/YourEndpoint</was:To>
  </s12:Header>
  <s12:Body>
    <wax:GetMetadata>
        <wax:Dialect>
           http://aaa.bbb.com/printer/DeviceData
        </wax:Dialect>
    </wax:GetMetadata>
  </s12:Body>
</s12:Envelope>
```

FIG. 5

```
501
<s12:Envelope
    xmlns:s12="http://www.w3.org/2003/05/soap-ebvelope"
    xmlns:wsa="http://schemas.xmlsoap.org/ws/2004/08/addressing"
    xmlns:wax="http://schemas.xmlsoap.org/ws/2004/09/mex" >
  <s12:Header>
    <wsa:Action>
        http://schemas.xmlsoap.org/ws/2004/09/mex/GetMetadata/Response
    </wsa:Action>
    <wsa:RelatesTo>
        uuid:a6e37bfb-f324-4e71-b33a-4f6d5c6027f4
    </wsa:RelatesTo>
    <wsa:To>http://client.example.com/MyEndpoint</was:To>
  </s12:Header>
  <s12:Body>
    <wax:Metadata>
      <wax:MetadataSection
          Dialect="http://aaa.bbb.com/printer/DeviceData" >
        <DeviceData>
          <Manufacturer>xxx company</Manufacture>          — 502
          <ModelName>Network Printer123</ModelName>        — 503
        </DeviceData>
      </wax:MetadataSection>
    </wax:Metadata>
  </s12:Body>
</s12:Envelope>
```

FIG. 7

```
<s:Envelope
    xmlns:a="http://schemas.xmlsoap.org/ws/2004/08/addressing"
    xmlns:d="http://schemas.xmlsoap.org/ws/2005/04/discovery"
    xmlns:i="http://printer.example.org/2003/imaging"
    xmlns:s="http://www.w3.org/2003/05/soap-ebvelope" >
  <s:Header>
    <a:Action>
        http://schemas.xmlsoap.org/ws/2005/04/discovery/Probe
    </a:Action>
    <a:MessageID>
        uuid:0a6dc791-2be6-4991-9af1-454778a1917a
    </a:MessageID>
    <a:To>urn:schemas-xmlsoap-org:ws:2005:04:discovery</a:To>
  </s:Header>
  <s:Body>
    <d:Probe>
        <d:Types>i:PrintBasic</d:Types>
        <d:Scopes
          MatchBy="http://schemas.xmlsoap.org/ws/2005/04/discovery/ldap" >
          ldap:///ou=engineering,o=examplecom,c=us
        </d:Scopes>
    </d:Probe>
  </s:Body>
</s:Envelope>
```

```
<a:Envelope
   xmlns:a="http://schemas.xmlsoap.org/ws/2004/08/addressing"
   xmlns:d="http://schemas.xmlsoap.org/ws/2005/04/discovery"
   xmlns:i="http://printer.example.org/2003/imaging"
   xmlns:s="http://www.w3.org/2003/05/soap-ebvelope" >
<a:Header>
   <a:Action>
      http://schemas.xmlsoap.org/ws/2005/04/discovery/ProbeMatches
   </a:Action>
   <a:MessageID>
      uuid:e32e6863-ea5e-4ee4-997e-69539d1ff2cc
   </a:MessageID>
   <a:RelatesTo>
      uuid:0a6dc791-2be6-4991-9af1-454778a1917a
   </a:RelatesTo>
   <a:To>
      http://schemas.xmlsoap.org/wa/2004/08/addressing/role/anonymous
   </a:To>
   <d:AppSequence InstanceId="1077004800" MessageNumber="2" />
</s:Header>
<s:Body>
   <d:ProbeMatches>
      <d:ProbeMatch>
         <a:EndpointReference>
            <a:Address>
               uuid:98190dc2-0890-4ef8-ac9a-5940995e6119
            </a:Address>
         </a:EndpointReference>
         <d:Types>i:PrintBasic i:PrintAdvanced</d:Types>
         <d:Scopes>
            ldap:///ou=engineering,o=examplecom,c=us
            ldap:///ou=floor1,ou=b42,ou=anytown,o=examplecom,us
            http://itdept/imaging/deployment/2004-12-04
         </d:Scopes>
         <d:XAddrs>http://prn-example/PRN42/b42-1668-a</d:XAddrs>
         <d:MetadataVersion>75965</d:MetadataVersion>
      </d:ProbeMatch>
   </d:ProbeMatches>
</s:Body>
</s:Envelope>
```

```
<s:Envelope ... >
  <s:Header ... >
    <a:Action ... >
        http://schemas.xmlsoap.org/ws/2005/04/discovery/Bye
    </a:Action>
    <a:MessageID ... >xs:anyURI</a:MessageID>
    <a:To ... >urn:schemas-xmlsoap-org:ws:2005:04:discovery</a:To>
    <d:AppSequence ... />
    ...
  </s:Header>
  <s:body ... >
    <d:Bye ... >
      <a:EndpointReference> ... </a:EndpointReference>
      ...
    </d:Bye>
  </s:Body>
</s:Envelope>
```

1001

1002 — `<a:EndpointReference> ... </a:EndpointReference>`

FIG. 18

| PRINT QUEUE ID 1811 | STATUS INFORMATION 1812 | PRINTER DRIVER IDENTIFIER 1813 | ADDRESS 1814 |
|---|---|---|---|
| PRINT QUEUE 1 | OFFLINE STATUS INFORMATION 1 | COMPATIBLE PRINTER DRIVER 1 | ADDRESS 21 |
| PRINT QUEUE 2 | OFFLINE STATUS INFORMATION 2 | COMPATIBLE PRINTER DRIVER 2 | ADDRESS 22 |
| PRINT QUEUE 3 | OFFLINE STATUS INFORMATION 3 | COMPATIBLE PRINTER DRIVER 1 | ADDRESS 23 |

| USER ID | AUTHORITY INFORMATION |
|---------|----------------------|
| USER A  | GUEST                |

| USER NAME | USER ATTRIBUTE |
|---|---|
| USER A | GUEST |
| USER B | USER |
| USER C | USER |
| USER D | USER |

FIG. 22

| DRIVER IDENTIFIER | ATTRIBUTE |
|---|---|
| COMPATIBLE PRINTER DRIVER A | NORMAL |
| COMPATIBLE PRINTER DRIVER B | NORMAL |
| COMPATIBLE PRINTER DRIVER 1 | GUEST |
| COMPATIBLE PRINTER DRIVER 2 | GUEST |
| COMPATIBLE PRINTER DRIVER | GUEST |

INFORMATION PROCESSING APPARATUS, INFORMATION PROCESSING METHOD, AND PROGRAM THEREOF

BACKGROUND OF THE INVENTION

1. Field of the Invention

The present invention relates to a peripheral device compatible to a network, an information processing apparatus for controlling the peripheral device, an information processing method, and a program thereof.

2. Description of the Related Art

Conventionally, a service providing apparatus which provides service in response to a service request from a client device on a network, and a service providing system are known. Along with the dramatic popularization of communications via the Internet, many devices of types other than a conventional personal computer have been developed as network compatible devices. For example, network compatibility of user interactive devices such as a personal data assistant (PDA), portable phone, and the like, image processing devices such as a scanner, printer, copying machine, digital camera, and the like, and also various devices including electronic home appliances such as a television, air conditioner, refrigerator, and the like have rapidly advanced. Note that PDA is short for personal data assistant.

In order to improve convenience and to allow easy management using such network compatible devices, various protocols and architectures have been proposed (patent references 1 and 2). These proposals include search and retrieve means of network devices which provide services, automatic setup means of application software, utility software, an operating system, and the like required to control network devices, and the like.

In order to enhance and apply a plug-and-play function which has been applied to local I/O-connected devices to network devices, a plurality of corporations and standard-setting organizations have developed its specifications. For example, UPnP (TM: non-patent reference 1) the development of which has been mainly made by Microsoft Corporation, Inc. is known. Also, WSD: Web Services for Devices (WS-Discovery/WS-MetadataExchange: non-patent references 2 and 3) is known. Furthermore, Rendezvous supported by OS X developed by Apple Computer, Inc., and the like are available as examples of such. In addition, as for WSD, BMLinks basic specification Version 1.2 (Japan Business Machine and Information System Industries Association, Internet URL: http://www.jbmia.or.jp/bmlinks/index.htm) is known.

[Patent Reference 1] Japanese Patent Laid-Open No. 2004-038956

[Patent Reference 2] Japanese Patent Laid-Open No. 2004-362594

[Non-patent Reference 1] "UPnP(TM) Device Architecture" version 1.0, Jun. 8, 2000, (Internet URL: http://www.upnp.org/download/UPnPDA10_20000613.htm)

[Non-patent Reference 2] "Web Service Dynamic Discovery (WS-Discovery)", April 2005 (Internet URL: http://specs.xmlsoap.org/ws/2005/04/discovery/ws-discovery.pdf)

[Non-patent Reference 3] "WS-MetadataExchange", September 2000, Microsoft Corporation, Inc., (Internet URL: http://msdn.microsoft.com/library/en-us/dnglobspec/html/ws-metadataexchange.pdf)

In this way, the prevalence of the network plug-and-play (also called network PnP) function improves the convenience of users. However, whether or not a user can actually use a network device recognized by network plug-and-play cannot be determined.

In other words, the network plug-and-play function unwantedly installs a driver and application of a network device in a computer. A case will be examined below wherein the network plug-and-play function automatically installs the driver and application of a given network device in a computer, and that device is then disconnected from the network and can no longer be used from the computer. Even in that case, the user can select the driver and application of that device as the device driver or application to be used. For this reason, the user cannot recognize why he or she cannot use the network device.

For example, in some cases, the user moves a portable personal computer from home or a business office to an other office, a hot spot provided to public facilities, or the like, and temporarily accesses a different network environment. In this case, every time the plug-and-play function of portable personal computers discover a network device running in the network environment at the destination, it automatically installs a driver and application of that network device. That is, the portable personal computer is installed with the printer drivers to be ordinarily used, and those to be temporarily used. Even after the portable personal computer disjoins from the temporarily accessed network environment, the installed driver and application still remain in the portable personal computer. The driver and application of the device which can no longer be used remain in the portable personal computer, resulting in inconvenience in terms of use. The hardware resources and, especially, memory resources of the device and portable personal computer are wastefully used. Of course, this problem is posed for not only portable personal computers but also network devices with the network PnP function. That is, a printer driver which was installed after logging in of a temporary guest user must be uninstalled since it is not ordinarily used. On the other hand, a device driver which was installed after logging in of a user other than the guest user such as an administrator user may be frequently used. For this reason, if such a driver is uninstalled without careful consideration, it cannot be used at the right moment.

SUMMARY OF THE INVENTION

The present invention has been made in consideration of the above prior arts, and has as its object to improve the user's operability by determining based on the attribute of an installed device driver whether or not to execute uninstall processing, since software of a device which cannot be detected by the network plug-and-play function can be uninstalled.

It is another object of the present invention to effectively use limited computation resources by uninstalling software which can no longer be used.

The present invention has been made in consideration of the above prior arts, and comprises the following arrangement. That is, an information processing apparatus connected to a peripheral device, comprises:

a reception unit adapted to receive a network leaving message from the peripheral device;

a first determination unit adapted to determine if a device driver corresponding to the peripheral device as a source of the network leaving message received by the reception unit meets a predetermined condition; and an uninstall unit adapted to uninstall the device driver corresponding to the peripheral device as the source of the network leaving message when the first determination unit determines that information of the device driver meets the predetermined condition.

According to the present invention, the user's operability can be improved by uninstalling software which was installed to use a device which cannot be detected by the network plug-and-play function.

By uninstalling unusable software, limited computation resources can be effectively used.

Further features of the present invention will become apparent from the following description of exemplary embodiments with reference to the attached drawings.

BRIEF DESCRIPTION OF THE DRAWINGS

FIG. 3 shows a Hello message format defined by the WS-Discovery specification;

FIG. 4 shows a GetMetadata message format defined by the WS-MetadataExchange specification;

FIG. 5 shows the GetMetadataResponse message format defined by a WS-MetadataExchange specification;

FIG. 7 shows a Probe message format defined by the WS-Discovery specification;

FIG. 8 shows a Probe Match message format defined by the WS-Discovery specification;

FIG. 10 shows a Bye message format defined by the WS-Discovery specification;

FIG. 18 shows an example of print queue information;

FIG. 19 shows an example of user information;

FIG. 21 shows an example of information required to manage the user according to the present application; and FIG. 22 shows an example of management of device drivers installed in a client device according to the present application.

DESCRIPTION OF THE EMBODIMENTS

First Embodiment

Preferred embodiments of the present invention will be described in detail hereinafter with reference to the accompanying drawings. Note that protocols, versions, addresses, numerical values, and the like described in the embodiments are not intended to limit the scope of the present invention.

<Hardware Arrangement of Print System>

Figure 17:
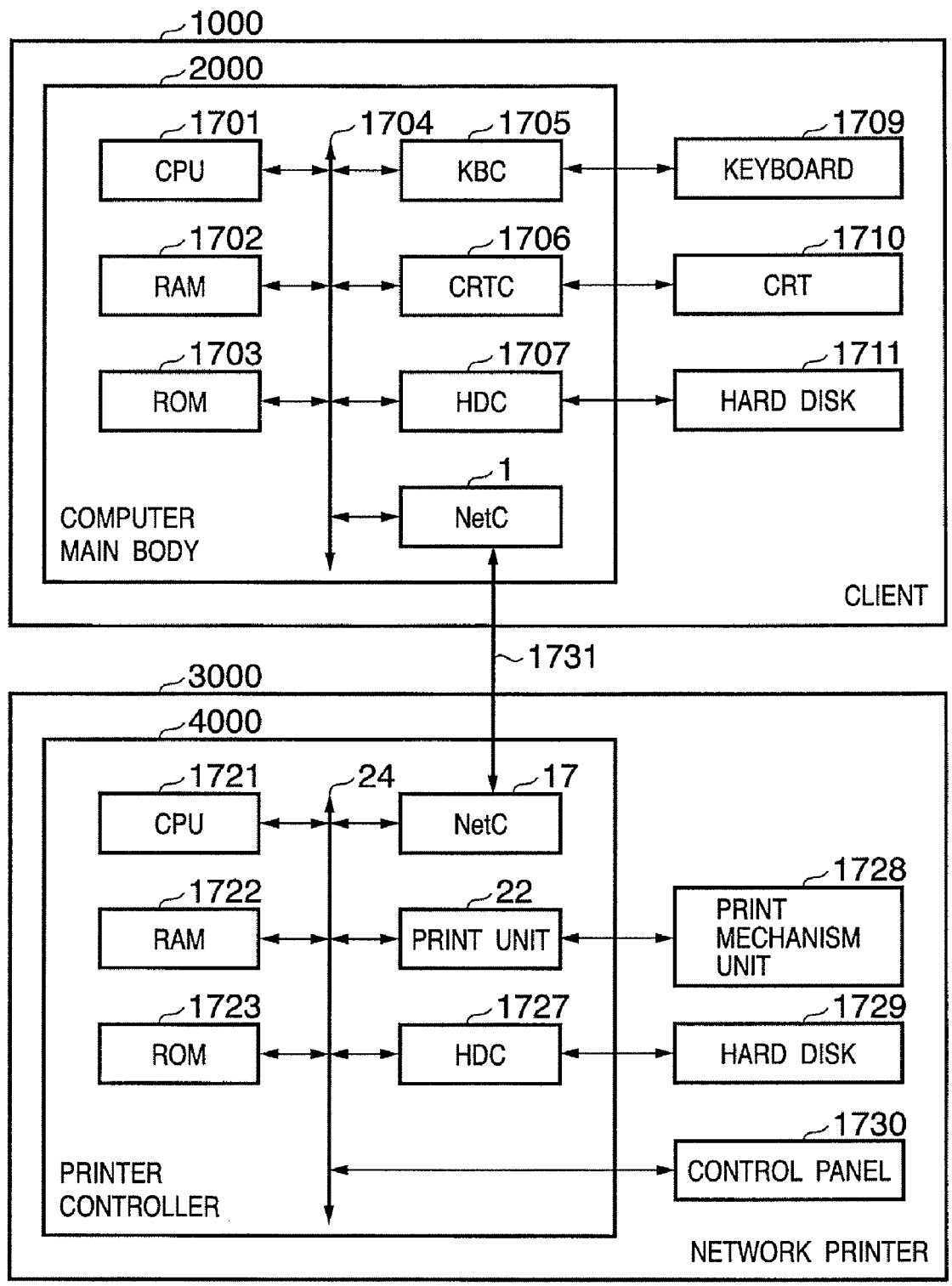
FIG. 17 is a hardware block diagram of a print system.
Figure 20:
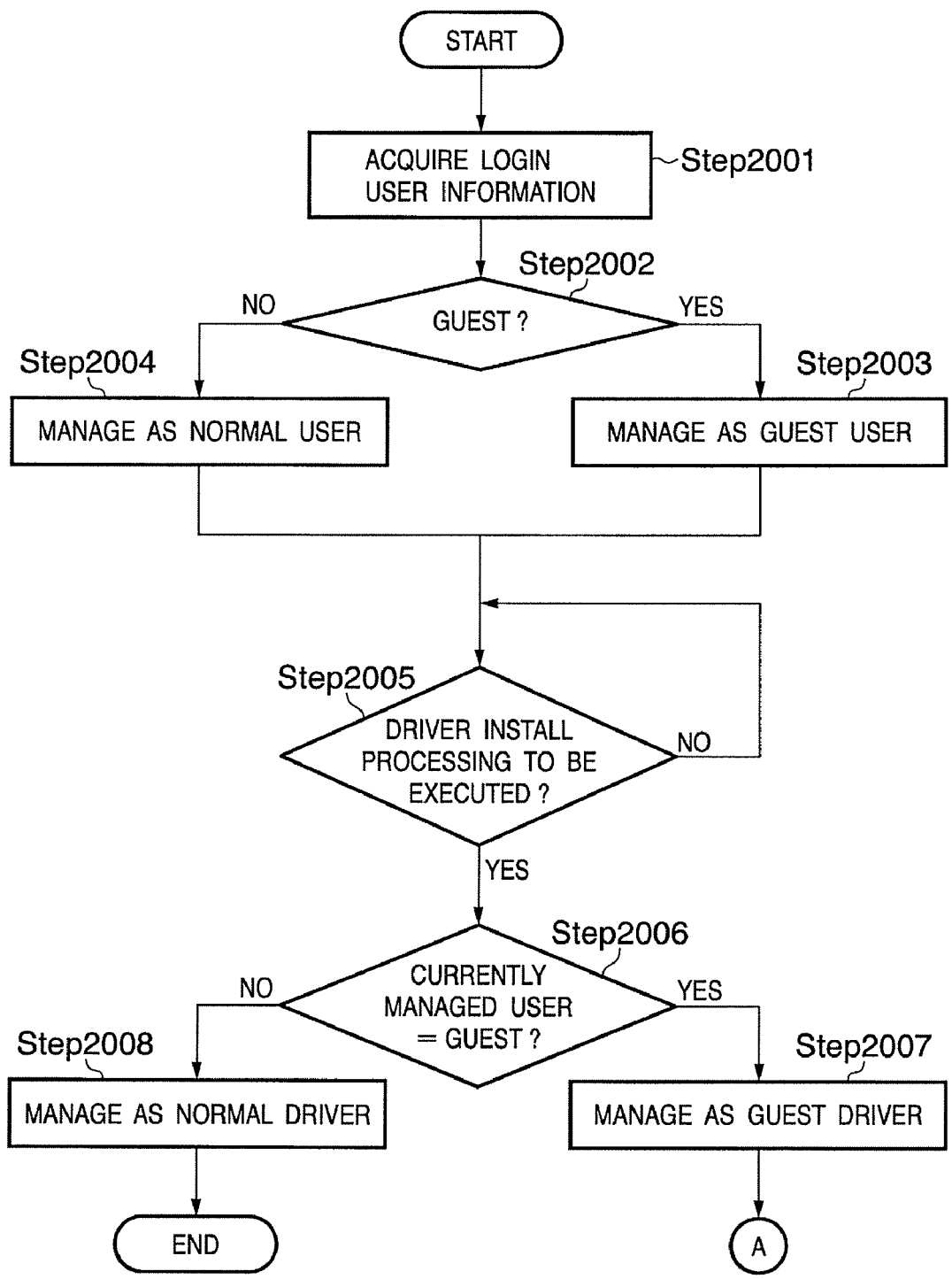
FIG. 20 is a flowchart of processing in a client device.

FIG. 17 is a block diagram showing the hardware arrangement focused on one client and one network printer, which are connected to a network print system according to one embodiment of the present invention. In FIG. 17, a client 1000 and a network printer 3000 as a printer are connected via a network 1731. In the client 1000, a keyboard 1709, CRT 1710, hard disk 1711, and the like as external devices are connected to a computer main body 2000. The computer main body 2000 comprises a CPU 1701, which can make arithmetic operations by mapping control programs and applications stored in a ROM 1703 or the hard disk 1711 on a RAM 1702. A keyboard controller (KBC) 1705 controls inputs from the keyboard 1709 as the external device. A CRT controller (CRTC) 1706 controls display on the CRT 1710. A hard disk controller (HDC) 1707 controls inputs and outputs to and from the hard disk 1711. Reference numeral 1 denotes a network controller (NetC), which is connected to the printer 3000 via the network 1731 and controls communications with a printer controller 4000.

The CPU 1701, RAM 1702, ROM 1703, KBC 1705, CRTC 1706, HDC 1707, and NetC 1 are respectively connected via a system bus 1704, and the CPU 1701 systematically controls the respective devices. The hard disk 1711 or RAM 1702 holds an installed device list which especially indicates the installed states of device drivers of network printers in this embodiment. The installed device list includes a name (identifier), IP address, driver name, icon file name, and the like of a device, which are recognized by the UPnP function provided by an operating system installed in the computer 1000. These pieces of information can also be obtained from a registry as a database of system information managed by the operating system. Hence, the same pieces of information as those in the installed device list can be referred to with reference to the registry. That is, this embodiment has the installed device list, but the installed device list need not be specially prepared if the registry is used.

Note that this embodiment assumes a personal computer (PC) as the client. However, the client is not limited to the PC as long as it can carry out the present invention, and a portable information terminal such as a PDA or the like, a portable phone, digital home appliances, and the like may be used as the client. Any of these devices has the same arrangement as that of the computer 1000 shown in FIG. 1, except for input and output devices for specific use purposes.

In the network printer 3000, a printer CPU 1721 executes control programs stored in a program area of a ROM 1723. Upon execution of the control programs, the printer CPU 1721 systematically controls access to various devices connected to a bus 1724 to output an image signal as print data to a print mechanism unit 1728 (printer engine) connected via a print unit 22.

The CPU 1721 can execute communication processing with the client 1000 via a network controller (NetC) 17. The CPU 1721 can notify the client 1000 of information and the like in the network printer 3000 via communications. A RAM 1722 serves as a main memory, work area, and the like of the CPU 1721. The RAM 1722 is also used as a bitmap memory, video signal information storage area, and the like for storing print data and image bitmap data received from the client 1000. A hard disk 1729 controlled by a hard disk controller 1727 is used for BOX storage and the like of print job data. A control panel 1730 is a user interface used when the user operates the network printer 3000, and includes a touch panel type liquid crystal panel, and the like in addition to various switches, LED indicators, and the like. Via this control panel 1730, the user can input an instruction to disconnect and remove that printer 3000 from the network 1731, i.e., an instruction to permanently remove. it. Information indicating this instruction is stored in the RAM 1722, and is transmitted from the printer 3000. Note that the information which is saved in the RAM 1722 and indicates that the printer 3000 is permanently removed becomes the basis for determining the type of a bye message (also called a network leaving message) which indicates separation from the network.

The hard disk 1729 stores a configuration information database indicating the configuration of the printer 3000. The configuration database is a database including various types of data. The configuration database includes device type information, service information, and use frequency information, print speed information, color function information indicating the presence/absence of a color print function, highest resolution information, double-sided printing function information indicating the presence/absence of a double-sided print function, manufacturer information, and the like of the device.

Note that the network printer 3000 may be either a single-function printer or a multi-function printer that comprises a scanner function, copy function, facsimile function, and the like, as long as that device can carry out the functions of the present invention. The functions of the present invention are not limited by the print mechanism unit 1728 which adopts any of print systems such as a laser beam printer, a printer using an ink-jet print mechanism, a thermal printer, and the like.

<Arrangement of PnP System>

Figure 1:
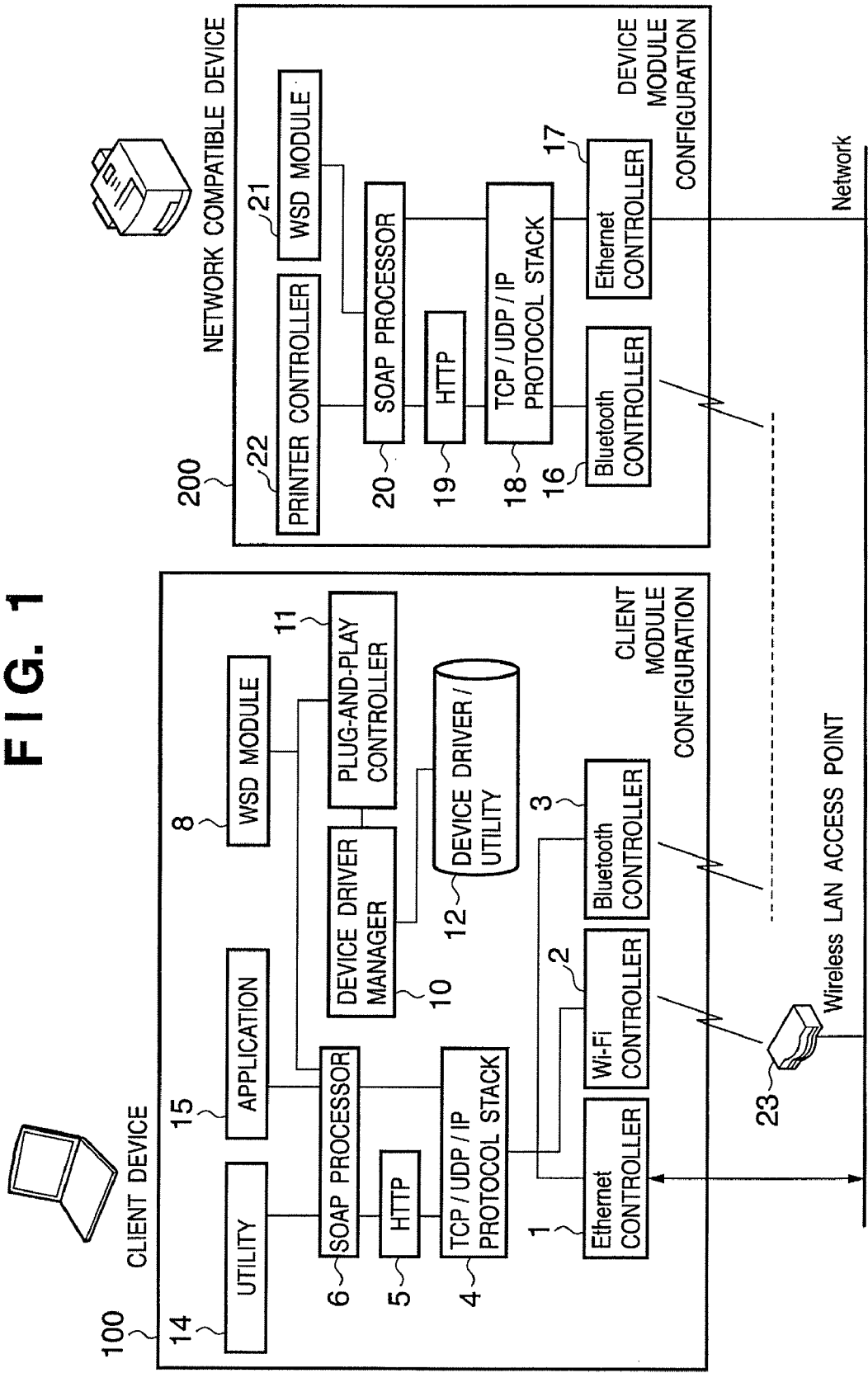
FIG. 1 is a schematic block diagram showing the arrangement of a network plug-and-play system according to one embodiment of the present invention.

FIG. 1 is a block diagram showing the arrangement of a network plug-and-play system according to one embodiment of the present invention. Referring to FIG. 1, layers above hardware devices such as an Ethernet® controller and the like are implemented when the CPUs execute software loaded onto the RAM 1702 and RAM 1722.

In FIG. 1, a client device 100 is a client computer, and is a portable personal computer in this embodiment. However, the present invention can be applied to computing devices having a network plug-and-play function, for example, a PDA, portable phone, and the like.

The client device 100 is compliant to Ethernet®, WiFi® (IEEE802.11a/b/g), and Bluetooth® as communication functions. For this purpose, the client device 100 comprises an Ethernet® controller 1, WiFi controller 2, and Bluetooth controller 3. The client device 100 comprises a TCP/UDP/IP protocol stack 4 as an upper layer of these controllers, and comprises an HTTP 5 above that protocol stack to parse an HTTP request and execute response processing.

The client device 100 comprises a Simple Object Access Protocol (SOAP) processor 6 as an upper layer of the TCP/UDP/IP protocol stack 4 and HTTP 5. A WSD module 8, utility 14, and application 15 implement two-way communications of data described in eXtensible Markup Language (XML) via the SOAP processor 6, respectively. Note that "SOAP" is a protocol for making inter-object communications via the network. The SOAP defines a data structure described in XML, and HTTP and SMTP are used as transfer protocols. The SOAP processor 6 parses objects described according to the SOAP, and executes processing.

The WSD module 8 executes response processing to a Hello message sent from a network device via the SOAP processor 6 based on the WS-Discovery specification, the development of the specification of which is promoted by Microsoft Corporation, Inc. and others Furthermore, the WSD module 8 executes issuance processing of a Probe message to conduct a network device search. The Hello message is network entry notification. The WSD module 8 acquires attribute information of a network device by issuing a GetMetadata message based on the WS-MetadataExchange specification. Furthermore, the WSD module 8 executes response processing to a Bye message sent from a network device based on the WS-Discovery specification.

If a network device is discovered by these message processes, the WSD module 8 notifies a plug-and-play controller 11 of attribute information of the discovered network device. The plug-and-play controller 11 comprises a function of. installing a corresponding driver and utility software 12 in the client device 100 via a device driver manager 10 based on the attribute information.

On the other hand, if disjoin of a network device from the network is discovered, the WSD module 8 notifies the plug-and-play controller 11 of address information of the network device whose disjoin is discovered. The plug-and-play controller 11 comprises a function of uninstalling the driver and utility software from the client device 100 via the device driver manager 10 based on the network address information. The client can discover disjoin of a network device from the network upon reception of a Bye message which is sent from the network device onto the network by broadcast or to hosts by multicast.

The application 15 prints a document edited by, e.g., a wordprocessor using a printer. In this case, the application 15 sends job data and print data to a network compatible device 200 via the driver and utility installed by the plug-and-play controller 11.

On the other hand, the network compatible device 200 is a network compatible printer in this embodiment. The network compatible device 200 is compliant to Ethernet®, WiFi® (IEEE802.11a/b/g), and Bluetooth® as communication functions, the first two of which are controlled by an Ethernet® controller 17, and the last one of which is controlled by a Bluetooth controller 16. The network compatible device 200 comprises a TCP/UDP/IP protocol stack 18 as an upper layer of these controllers, and an HTTP 19 above that protocol stack to parse an HTTP request and execute response processing.

The network compatible device 200 comprises a SOAP processor 20 as an upper layer of the TCP/UDP/IP protocol stack 18 and HTTP 19. A WSD module 21 and printer controller 22 implement two-way communications of data described in extensible Markup Language (XML) via the SOAP processor 20, respectively.

The WSD module 21 sends a Hello message via the SOAP processor 20 based on the WS-Discovery specification upon establishing connection to the network. Furthermore, the WSD module 21 executes response processing to a Probe message issued by the client device 100.

The WSD module 21 returns attribute information of the network compatible device 200 in response to a GetMetadata message issued by the client device 100 based on the WS-MetadataExchange specification. In this embodiment, the network compatible device 200 is a network compatible printer. Furthermore, the WSD module 21 sends a Bye message based on the WS-Discovery specification upon disjoining from the network.

Note that the client device 100 can connect an Ethernet® via a wireless LAN access point 23 connected to the network.

<Device Recognition Procedure Based on Network PnP>

The control procedure of the present invention will be described below with reference to the flowcharts. In the flowcharts to be described below, the WSD module 8 mainly executes the processing by "client device 100", and the WSD module 21 mainly executes the processing by "network compatible device 200". The processing by "client device 100" also includes those by the plug-and-play controller 11 and device driver manager 10. Since the processing in layers under the SOAP processors follows the specification by W3C, a description thereof will be omitted.

<Network Plug-and-Play Processing 1>

Figure 2:
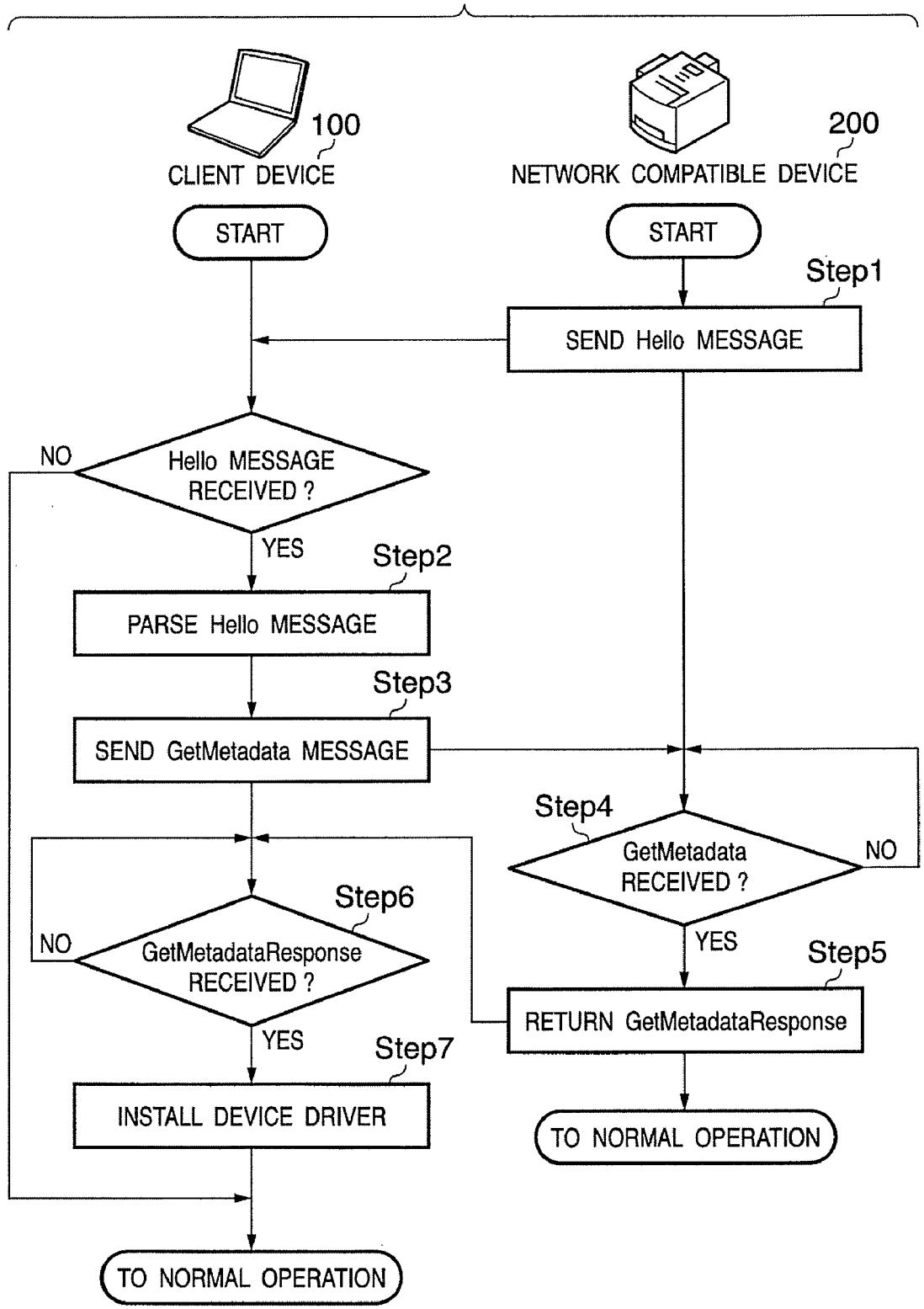
FIG. 2 is a flowchart showing the procedure of plug-and-play processing for a network device.

FIG. 2 is a flowchart for explaining the control procedure upon executing plug-and-play processing for a network device. The procedure shown in FIG. 2 is an example in which the network compatible device takes initiative when it goes online.

Upon connecting to the network, the WSD module 21 of the network compatible device 200 requests the SOAP processor 20 to send a Hello message. "Upon connecting to the network" includes a case wherein a new device is connected to the network and starts a communication, a case wherein the power supply of a device in a power OFF state is turned ON and restarts a communication on the network, and so forth. The SOAP processor 20 generates a Hello message based on the WS-Discovery specification, and sends the generated message by multicast to a multicast address 239.255.255.250 via the protocol stack (step S1).

The Hello message is described in XML-SOAP, and FIG. 3 shows an example of the format of that message 301. The Hello message includes information such as a source address URI 303, device type 302 (printer in this example), meta data version 304, and the like. Since this embodiment uses TCP/IP as a communication protocol, TCP and IP packet headers include a source port number and IP address. With these pieces of information, a receiving side device of the Hello message can specify a device as the source of that message and the meaning of the message.

The Hello message is sent to the SOAP processor 6 of the client device 100 via the TCP/UDP/IP protocol stack 4. Upon reception of the Hello message, the SOAP processor 6 parses its contents, and notifies the WSD module 8 of that result (step S2). The WSD module 8 acquires attribute information of a network device which issued the Hello message. For this purpose, the WSD module 8 requests the SOAP processor 6 to issue a GetMetadata message, which has the address described in the Hello message as a destination and is specified by WS-MetadataExchange. The SOAP processor 6 generates a GetMetadata message based on the WS-MetadataExchange specification. The SOAP processor 6 sends the generated message to the network compatible device 200 via the TCP/UDP/IP protocol stack 4 by unicast (step S3). The GetMetadata message is described in XML-SOAP, and FIG. 4 shows an example of its message format.

The network compatible device 200 receives the GetMetadata message from the client device 100 (step S4). The SOAP processor 20 is notified of the received GetMetadata message via the TCP/UDP/IP protocol stack 18. The SOAP processor 20 parses the contents of the GetMetadata message, and notifies the WSD module 21 of that result. The WSD module 21 requests the SOAP processor 20 to issue a GetMetadataResponse message specified by WS-MetadataExchange so as to return the designated attribute information to the client. The SOAP processor 20 generates a GetMetadataResponse message based on the WS-MetadataExchange specification, and sends the generated message to the client by unicast via the protocol stack (step S5). The GetMetadataResponse message is described in XML-SOAP, and FIG. 5 shows an example of its message format. A GetMetadataResponse message 501 includes device attribute information such as a model name (device ID) 503, manufacturer name 502, and the like of the device.

The client device 100 receives the GetMetadataResponse message from the network compatible device 200 (step S6). The SOAP processor 6 is notified of the received GetMetadataResponse message via the TCP/UDP/IP protocol stack 4. The WSD module 8 is notified of the device attribute information described in the GetMetadataResponse message via the SOAP processor 6 of the client device 100. The WSD module 8 notifies the plug-and-play controller 11 of the device attribute information. Upon reception of the device attribute information, the plug-and-play controller 11 searches a storage device for a driver that matches the device attribute information via the device driver manager, and installs the corresponding driver (step S7). The device attribute information includes the manufacturer name and device name of the device. For this reason, the driver to be installed can be determined from these pieces of attribute information. When the device supports a plurality of services, drivers are installed for respective services.

After the device driver is installed, the client device 100 is ready to execute processing using the device corresponding to that device driver. On the other hand, the network compatible device 200 is ready for use by the client device in which the corresponding device driver is installed.

<Network Plug-and-Play Processing 2>

Figure 6:
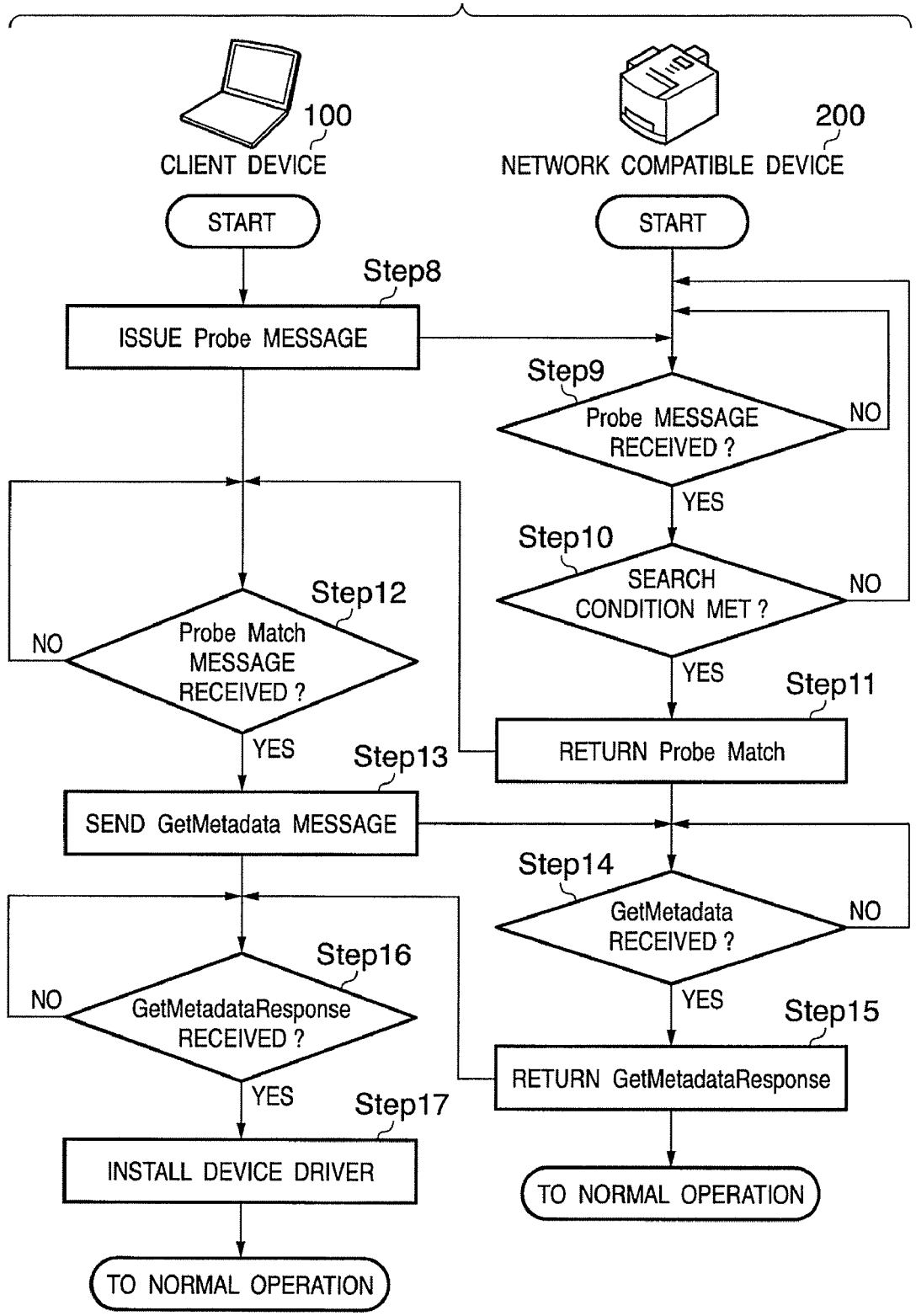
FIG. 6 is a flowchart showing the procedure of the control for searching and discovering a network compatible device.

FIG. 6 is a flowchart for explaining the control procedure executed when the client device 100 searches for a network compatible device 200 which is usable on the network.

The utility 14 or application 15 of the client device 100 requests the SOAP processor 6 to send a Probe message specified by the WS-Discovery specification. The SOAP processor 6 generates a Probe message based on the WS-Discovery specification, and sends the generated message to a multicast address 239.255.255.250 via the protocol stack by multicast. In this way, the search processing is implemented based on the presence/absence of a Probe Match message as a response from the network compatible device 200 to the Probe message.

The SOAP processor 6 sends a Probe message specified by the WS-Discovery specification to a multicast address 239.255.255.250 via the protocol stack by multicast (step S8). The Probe message is described in XML-SOAP, and FIG. 7 shows an example of its message format. A Probe message 701 includes a device type 702 indicating the type of a device as a search target. Since the present application exemplifies a printer as a search target, the device type 702 describes "PrintBasic" indicating the printer.

The network compatible device 200 receives the Probe message from the client device 100 (step S9). The SOAP processor 20 is notified of the received Probe message via the TCP/UDP/IP protocol stack 16. The SOAP processor 20 parses the contents of the Probe message, and notifies the WSD module 21 of that result. The WSD module 21 checks if the contents (i.e., the search target) of the notified message match the functions provided by this network compatible device 200 (step S10). If the WSD module 21 determines that the contents do not match, it ignores that information. Therefore, in such case, the network compatible device 200 does not issue any Probe Match response.

On the other hand, if the WSD module 21 determines that the search target of the Probe message matches the functions provided by the network compatible device 200, it requests the SOAP processor 20 to issue a Probe Match message. The SOAP processor 20 generates a Probe Match message based on the WS-Discovery specification, and sends the generated message to the client via the protocol stack by unicast (step S11). The Probe Match message is described in XML-SOAP, and FIG. 8 shows an example of its message format. A Probe Match message 801 includes an address (e.g., an IP address) of the responding device.

Upon reception of the Probe Match message by the client device 100 (step S12), the SOAP processor 6 is notified of that message via the TCP/UDP/IP protocol stack. The SOAP processor 6 parses the contents of the Probe Match message, and notifies the WSD module 8 of that result. The WSD module 8 acquires attribute information of the network compatible device 200 that issued the Probe Match message. For this purpose, the WSD module 8 requests the SOAP processor 6 to issue a GetMetadata message specified by WS-MetadataExchange. The address of the WS-MetadataExchange is that of the network compatible device described in the Probe Match message. The SOAP processor 6 generates a GetMetadata message based on the WS-MetadataExchange specification. The SOAP processor 6 sends the generated message to the network compatible device 200 via the protocol stack by unicast (step S13). The GetMetadata message is described in XML-SOAP, and is the same as that shown in FIG. 4 in the description of FIG. 2.

The network compatible device 200 receives the GetMetadata message from the client device 100 (step S14). The SOAP processor 20 is notified of the received GetMetadata message via the TCP/UDP/IP protocol stack 18. The SOAP processor 20 parses the contents of the GetMetadata message and notifies the WSD module 21 of that result. The WSD module 21 requests the SOAP processor 20 to issue a GetMetadataResponse message based on the WS-MetadataExchange specification, so as to return designated attribute information to the client. The SOAP processor 20 generates a GetMetadataResponse message based on the WS-MetadataExchange, and sends the generated message to the client via the protocol stack by unicast (step S15). The GetMetadataResponse message is described in XML-SOAP, and is the same as that shown in FIG. 5 in the above description.

The client device 100 receives the GetMetadataResponse message from the network compatible device 200 (step S16). The SOAP processor 6 is notified of the received GetMetadataResponse message via the TCP/UDP/IP protocol stack 4. The WSD module 8 is notified of the device attribute information described in the GetMetadataResponse message via the SOAP processor 6 of the client device 100. The WSD module 8 notifies the plug-and-play controller 11 of the device attribute information. Upon reception of the notification, the plug-and-play controller 11 searches the storage device for a driver that matches the device attribute information via the device driver manager, and installs the corresponding driver (step S17). This attribute search processing is as has been described above using FIG. 2.

After the device driver is installed, the client device 100 is ready to execute processing using the device corresponding to that device driver. On the other hand, the network compatible device 200 is ready to be used by the client device in which the corresponding device driver is installed.

<Uninstall Device Driver>

The standard network plug-and-play procedure has been described so far. Next, the procedure up to uninstallation of a device driver which is important in this embodiment will be described below. Prior to this description, a print queue and user information will be briefly explained.

(Print Queue)

A print queue is a software module which picks up spooled print data in a FIFO order, and sends it to the printer. The print queue is provided by the operating system. The print queue is associated with a printer driver installed in the client. One or a plurality of print queues are associated with one printer driver. This is because one print queue corresponds to one printer, while one printer driver corresponds to one or a plurality of models of printers. Even when a plurality of printers are usable, if all of them are of an identical model, only one driver is installed in the client.

Print data spooled via the data processing of the printer driver is sent to the printer in the FIFO order by a print queue corresponding to that printer driver. Association between the printer driver and print queue can be implemented by associating the address of the printer (i.e., network compatible device) to the printer driver and print queue, respectively. Therefore, if, for example, the address of the printer can be specified, the corresponding print queue and printer driver can be specified. Conversely, if the print queue can be specified, the corresponding printer driver can be specified based on the address of the corresponding printer.

Furthermore, the print queue has status information for each device driver. The status information includes offline status information indicating an offline state. By setting that value to "offline", issuance of a print job from the print queue to the corresponding printer stops. By returning the value of the offline status information to "online" again, the output of the print job restarts. Since such control processes are done by the operating system, switching between online and offline can be realized by rewriting the offline status information.

FIG. 18 shows an example of print queue information 1801 used to associate the print queue, status information, and printer driver. Of course, the format of the print queue information is not limited to that shown in FIG. 18, and any other formats may be used as long as association can be attained. The operating system manages the association information 1801. However, if the operating system does not have such data, the WSD module 8 may manage this information. In FIG. 18, a print queue ID 1811, status information 1812 (FIG. 18 shows offline status information alone), corresponding printer driver identifier 1813, and address 1814 of the printer are associated with each other.

(User Information)

The operating system also manages user information. FIG. 19 shows an example of the user information. In user information 1901, a login user ID 1911 and authority information 1912 of that user are saved in association with each other. In the example of FIG. 19, user A is "guest", and has a separately designated authority. The authority includes an access authority to files, and a use authority of peripheral devices such as a printer and the like. Especially, when login of a user who is not registered yet is permitted, the "guest" authority is assigned as the user authority to that user as a prescribed value. That is, the "guest" authority assumes assignment to a temporary user. If the user who has not made user registration yet performs a login operation, the guest authority is assigned to that user, and the login user ID and "guest" authority of this user are registered in the user information shown in FIG. 19.

(Uninstall Processing)

Processing for uninstalling a printer driver will be described below under the precondition that the client device 100 has the print queue information and user information. In the present application, a device driver which was installed while a given user logs in as a guest user becomes the driver to be uninstalled to be described later.

The device driver manager 10 acquires user information upon login (S2001). If this login indicates that to the client device 100, the device driver manager 10 acquires user information of the current login user from the operating system. That is, the operating system holds, for each user, user management information indicating whether or not each login user is a guest, as shown in FIG. 21. A user attribute can be determined based on the user ID input upon login. For example, if the current login user is user A, it can be determined in FIG. 21 that user A is a guest user, and user information shown in FIG. 19 is generated. On the other hand, if this login indicates a state wherein the client device is connected to a network environment which is not ordinarily used, a method of acquiring user information as follows may be used. For example, a MAC address as a general user (i.e., the user other than a guest) is registered in an external system. If the client device is connected to a network, it inquires this external system about the presence/absence of its own MAC address. If the own MAC address is registered in the external system, it is determined that the current network is the one which is ordinarily used; otherwise, it is determined that the current network is the one which is temporarily used.

Based on the above processing, the device driver manager checks if the login user is a guest user (S2002). That is, the client device 100 checks if the login user is a temporary user.

If it is determined that the user has not logged in as the guest user (S2002—No), the client device 100 manages the current login user as a normal user (the user other than a guest) (S2004). On the other hand, if it is determined in step S2002 that the user has logged in as a guest user (S2002—Yes), the client device 100 manages the current login user as a guest user (S2003).

The client device 100 checks if the install processing of a device driver is executed using the WSD module 8 and plug-and-play controller 11 (S2005). More specifically, the currently installed device drivers are managed, as shown in FIG. 22. If a new device driver is added to information shown in FIG. 22, it can be determined that the install processing is executed.

If it is determined in step S2005 that the install processing of a device driver is executed, the client device 100 checks if the current login user is a guest user (S2006). The processing in step S2006 can be judged based on the processing result in step S2002. If it is determined in step S2006 that the current login user is not a guest, the client device 100 manages the device driver installed in step S2005 as a normal driver (S2008). If it is determined in step S2006 that the current login user is a guest, the client device 100 manages the device driver installed in step S2005 as a guest driver (S2007). More specifically, the RAM 1702 of the client device 100 manages the device driver information in the format shown in FIG. 22. If the device driver installed as a guest driver is to be managed in step S2007, the next processing to be executed is that in step S19 in FIG. 9, step S1111 in FIG. 11, or step S1311 in FIG. 14.

Figure 9:
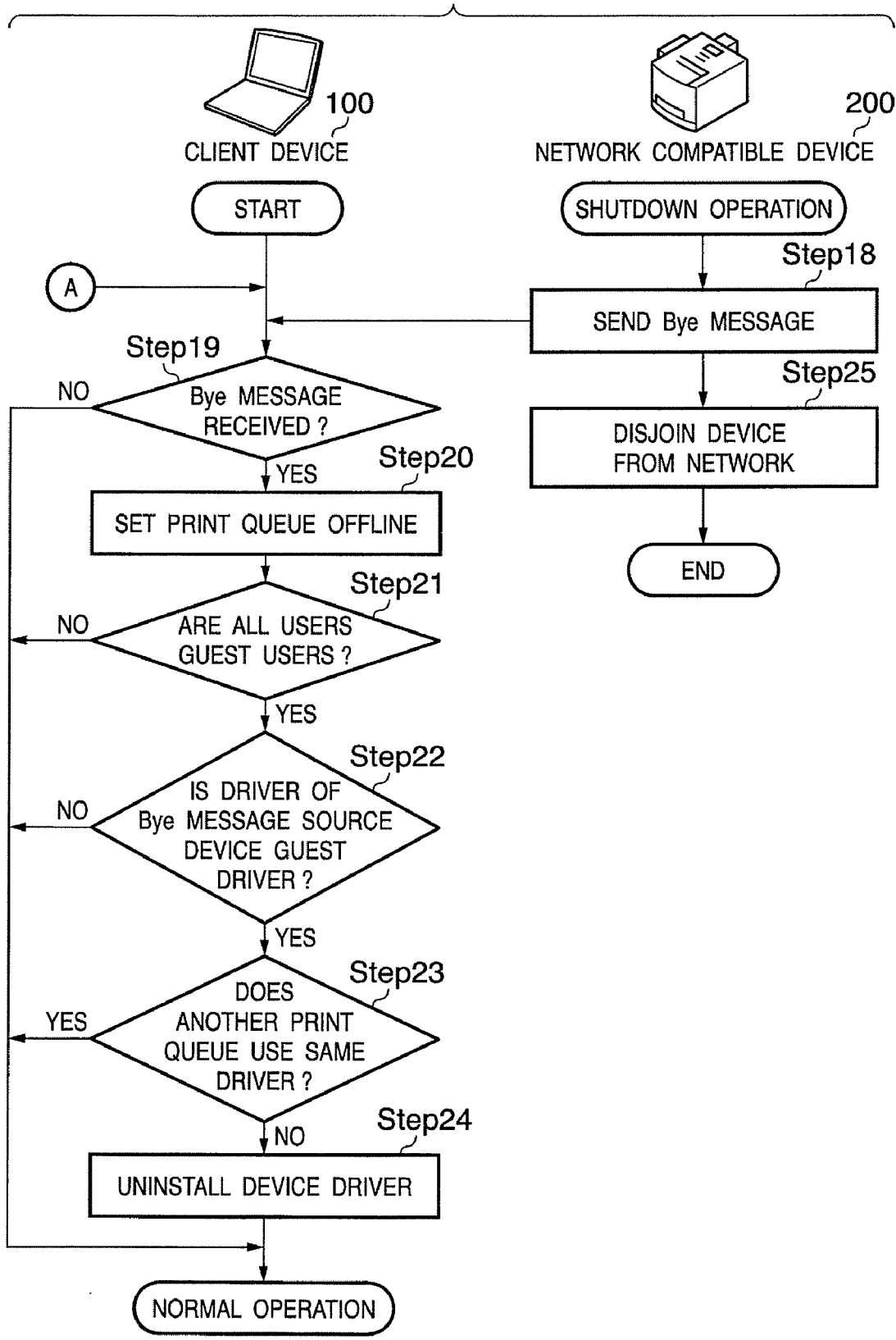
FIG. 9 is a flowchart showing the procedure of the control executed when a network compatible device disjoins from a network according to the first embodiment.

FIG. 9 will be described below. FIG. 9 is a flowchart for explaining the control procedure when a network device disjoins from a network in this embodiment. In this procedure, the aforementioned print queue information 1801 and user information 1901 are referred to. Note that the CPU 1701 of the client device 100 executes steps S19 to S25, and the CPU 1721 of the network compatible device 2000 executes steps S18 and S26. Note that the client device 100 that executes the processes in steps S19 to S24 holds programs to be executed by a computer connected to a peripheral device.

In order to disjoin the network compatible device 200 from the network, the user performs a shutdown operation from a control panel or the like of the network compatible device 200. In response to that operation as a trigger, the WSD module 21 requests the SOAP processor 20 to send a Bye message. The SOAP processor 20 generates a Bye message based on the WS-Discovery specification, and sends the generated message to a multicast address 239.255.255.250 via the protocol stack by multicast (step S18). The Bye message is described in XML-SOAP, and FIG. 10 shows an example of its message format. A Bye message 1001 includes address information 1002 embedded in an EndpointReference tag.

The client device 100 receives the Bye message from the network compatible device 200. The SOAP processor 6 is notified of the received Bye message via the TCP/UDP/IP protocol stack 4. The SOAP processor 6 parses the contents of the Bye message, and notifies the WSD module 8 of that result (step S19). The client device 100 receives a network leaving message from the peripheral device in step S19.

The WSD module 8 notifies the plug-and-play controller 11 of the device address. Upon reception of the notification, the plug-and-play controller 11 searches the storage device for a print queue associated with the device address via the device driver manager 10. This search is conducted with reference to, e.g., the print queue information shown in FIG. 18. The plug-and-play controller 11 searches the print queue information in FIG. 18 for the notified printer address, and a print queue identifier (ID) corresponding to the discovered address is a target print queue identifier (ID).

The plug-and-play controller 11 sets the corresponding print queue in an offline state (step S20). That is, the client device 100 sets offline status information 1802 of the discovered print queue to "offline". Note that as a visual effect of the offline state, the icon of the print queue may be grayed out or set to be translucent, thus clearly informing the user of the offline state.

The device driver manager 10 searches all the pieces of user account information of the client device 100 to see if all user accounts are guest users (step S21). This investigation is attained by acquiring and referring to the contents of the authority column 1912 of the user information shown in FIG. 19 from the operating system, and checking if all the acquired contents indicate "guest". In case of FIG. 19, the login user is only user A, and the attribute of user A is "guest". Hence, the device driver manager 10 determines in step S21 that all the user accounts are guest users.

If the device driver manager 10 determines that the all the user accounts are guest users, it checks if a device driver corresponding to the printer as the source of the Bye message is a guest device driver (step S22). That is, the client 100 checks if the device driver corresponding to the peripheral device as the source of the received network leaving message meets predetermined conditions. More specifically, the device driver manager 10 specifies a print queue ID from the source device address in the Bye message using FIG. 18. Then, the device driver manager 10 can determine using the specified print queue ID and the information shown in FIG. 22 whether or not the device driver was installed by the guest user. If it is determined in step S22 that the device driver corresponding to the source device of the Bye message is not a guest driver, since that device driver is not a driver to be uninstalled, the process jumps to a normal operation. On the other hand, if it is determined in step S22 that the printer driver corresponding to the source device of the Bye message is a guest driver, the device driver manager 10 checks the presence/absence of another printer which uses the corresponding printer driver (step S23). Upon reception of the Bye request (network leaving message), the client device 100 checks in step S23 if the device driver corresponding to the peripheral device as the source of the network leaving message is used for another peripheral device. If it is determined in step S23 that the device driver corresponding to the peripheral device as the source of the Bye request received in step S19 is not used for another peripheral device, the client device 100 uninstalls that device driver. More specifically, the device driver manager 10 searches the print queue information 1801 for the address of the source device of the Bye message. The device driver manager 10 reads a printer driver identifier corresponding to that address, and searches the print queue information 1801 for the read printer driver identifier. If a plurality of search results are obtained, it is determined that another print queue which uses the same device driver as that printer is present (S23—No). In this case, that device driver is used for a device other than the source device of the Bye message. Therefore, that device driver must not be uninstalled. Conversely, if the device driver corresponding to the source device of the Bye message is used for only the source device of the Bye message, and is not used for another device, it is determined that the driver is no longer used. For example, in case of FIG. 18, the printer driver identifier of print queue 1 indicates compatible printer driver 1. Also, the printer driver identifier of print queue 3 indicates compatible printer driver 1. Hence, when Bye information is acquired from the address corresponding to print queue 1, since print queue 3 also uses compatible printer driver 1 corresponding to print queue 1, the printer driver corresponding to the printer driver identifier "compatible printer driver 1" is not uninstalled.

The device driver manager 10 determines that another print queue which uses the device driver corresponding to the print queue associated with the address of the device is not present (step S23—Yes). In this case, the plug-and-play controller 11 uninstalls the device driver corresponding to the device which sent the Bye message in step S18 (step S24). That is, when the client device 100 determines in step S22 that the device driver information meets predetermined condition, it uninstalls the device driver corresponding to the peripheral device as the network leaving message source.

The client device repetitively executes steps S18 to S25 mentioned above every time a network compatible device issues a Bye message. In this way, the client device 100 can automatically uninstall the device driver if all the user accounts indicate "guest" and the device driver is not used by another print queue. That is, the client device 100 has storage means which identifiably stores a device driver which was installed after login of a temporary user as a guest device driver. After reception of the Bye request, if it is determined that the device driver corresponding to the peripheral device as the source of the network leaving message corresponds to the guest driver installed after login of the temporary user, the client 100 uninstalls the driver corresponding to the peripheral device as the network leaving message source. Note that the temporary user is synonymous with the guest user in the present application.

Note that the user authority is checked in step S21 to determine the use method of that client. For example, under the Windows® operating system, a client is normally assigned to a specific user, and is exclusively used by that user. Such user is registered in the client in advance and is given a "user", "power user", or "administrator" authority. By contrast, a portable client which is carried and used is normally shared by unspecified users. With such client, the user logs in with a "guest" authority, and uses that client. Hence, this embodiment estimates that when a login user has a "guest" authority, that client is that to be shared. Since the portable shared client is connected to unspecified networks, different network devices are used for respective networks. Hence, in this embodiment, if it is determined in step S21 that the user authority is "guest", it may be determined that the source device of the Bye message is a device temporarily used on the corresponding network. The plug-and-play controller 11 uninstalls the device driver corresponding to the device that sent the Bye message.

As described above, upon reception of a (Bye message) from the network from a device, the client device of this embodiment checks if a guest user installed the device driver corresponding to the device that sent the Bye message. Then, the client device automatically uninstalls the device driver installed by the guest user. For this reason, the labor upon management of device drivers can be saved. Also, the resources of a client terminal can be prevented from being wasted. Since the device driver which cannot be used can be uninstalled from device candidates presented to the user, the user operability improves. Furthermore, since the device driver installed by the guest user is uninstalled, the configuration of the client can be prevented from being carelessly changed. Moreover, since it is checked in step S24 in FIG. 9 if "another print queue uses the same driver", the device drivers required by the user remain, and appropriate uninstall processing can be executed.

Second Embodiment

In this embodiment, the search function of the network compatible device 200, practical means to implement Hello message response, and plug-and-play processing are the same as those in the first embodiment. The client device 100 executes processes in the procedures shown in the flowcharts of FIGS. 2 and 6. The standard network plug-and-play procedure progresses as has been described, and the procedure up to uninstall processing of a device driver which is important in this embodiment will be described below.

Figure 11:
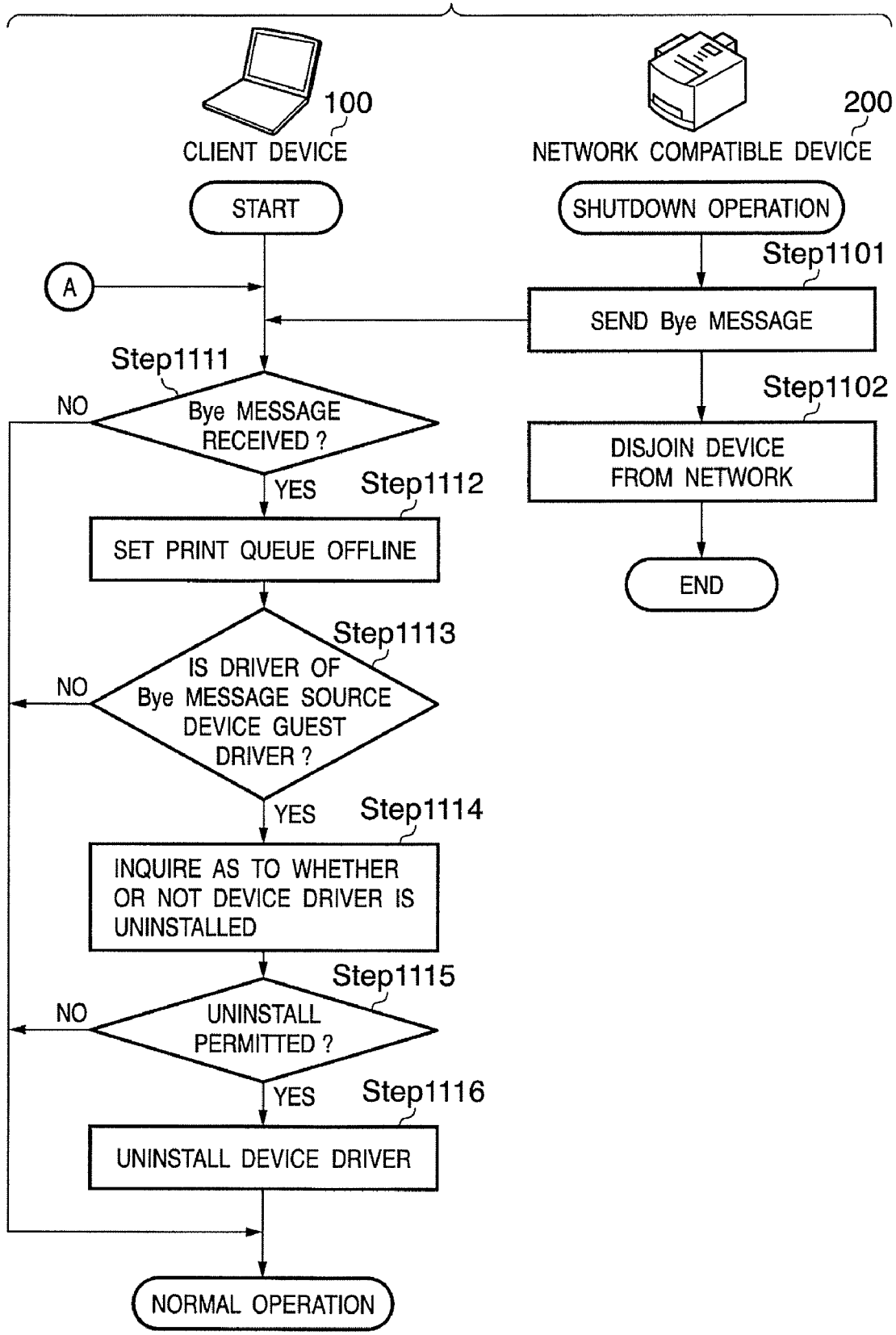
FIG. 11 is a flowchart showing the procedure of the control executed when a network compatible device disjoins from a network according to the second embodiment.

FIG. 11 is a flowchart for explaining the control procedure when a network device disjoins from the network in this embodiment. The same step numbers in FIG. 11 denote the steps having the same contents as in FIG. 9. Note that the CPU 1701 of the client device 100 executes processes from step S1111 to step S1115, and the CPU 1721 of the network compatible device 200 executes processes in steps S1101 and S1116.

Upon disjoining the network compatible device 200 from the network, the user performs, e.g., a shutdown operation. With this operation, when the network compatible device 200 disjoins from the network, the WSD module 21 requests the SOAP processor 20 to send a Bye message. The SOAP processor 20 generates a Bye message based on the WS-Discovery specification, and sends the generated message to a multicast address 239.255.255.250 via the protocol stack by multicast (step S1101). This processing is the same as that in step S18 in FIG. 9. The Bye message is described in XML-SOAP, and is the same as that shown in FIG. 10 in the above description.

The client device 100 receives the Bye message. The SOAP processor 6 is notified of the received Bye message via the TCP/UDP/IP protocol stack 4. The SOAP processor 6 parses the contents of the Bye message, and notifies the WSD module 8 of that result (step S1111). This processing is the same as that in step S19. The WSD module 8 notifies the plug-andplay controller 11 of the device address. Upon reception of the notification, the plug-and-play controller 11 searches the storage device for a print queue associated with the device address via the device driver manager 10, and sets the corresponding print queue in an offline state (step S1112). The search processing and offline processing are the same as those in step S20. Note that as a visual effect of the offline state, the icon of the print queue may be grayed out or set to be translucent, thus clearly informing the user of the offline state.

Figure 15:
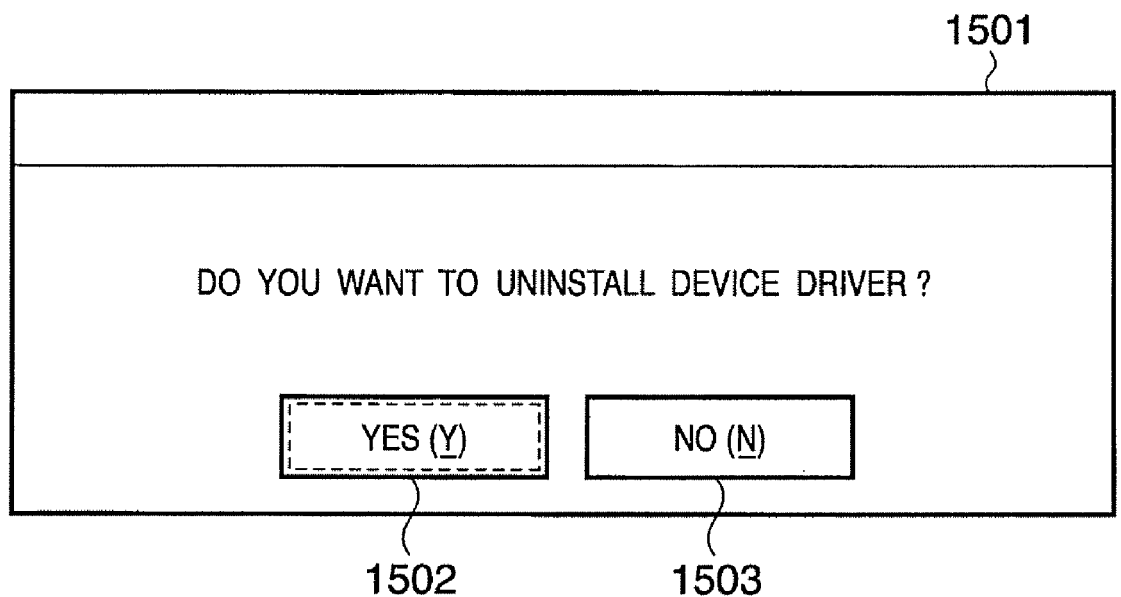
FIG. 15 shows an example of a dialog box used to confirm execution of uninstallation of a device driver.

Furthermore, the device driver manager 10 checks if a device driver corresponding to the printer as the source of the Bye message is a guest device driver (step S1113). Note that the processing in step S1113 is the same as that in step S22 in FIG. 9. If the device driver corresponding to the source device of the Bye message is not a guest driver, the device driver manager 10 displays an uninstall confirmation dialog 1501 (FIG. 15) in correspondence with each offline print queue (step S1114). When the dialog also displays the device name of the source device of the Bye message, the user can identify the device, thus further improving the operability. If the user presses a "YES" button 1502 on the dialog box 1501, the uninstall processing of the device driver proceeds. If the user presses a "NO" button 1503, the uninstall processing of the device driver. is canceled.

If the user permits the uninstall processing of the driver (if he or she presses "YES"), the plug-and-play controller 11 of the client device 100 checks if the driver corresponding to the device that sent the Bye message is a guest driver. If it is determined that the driver is a guest driver, the plug-and-play controller 11 uninstalls the device driver of the source device of the Bye message (step S1116).

That is, upon reception of the Bye request (network leaving message), the client device 100 inquires the user if the device driver corresponding to the peripheral device as the network leaving message source is to be uninstalled. If the user instructs to uninstall in response to the inquiry, the client device 100 uninstalls the device driver of the peripheral device as the Bye request source.

Every time a Bye message is issued, the client device 100 repetitively executes steps S1111 to S1115. In this way, only when the user permits the uninstall processing of the device driver, the client device 100 automatically uninstalls the device driver. Unlike in the first embodiment, since this embodiment requires user's intervention to proceed with the uninstall processing, the user's confirmation can be obtained for the driver to be uninstalled.

Third Embodiment

The search function of the network compatible device 200, practical means to implement Hello message response, and plug-and-play processing are the same as those in the first embodiment. The network compatible device 200 executes processing in the procedure shown in steps S1, S4, and S5 in the flowchart of FIG. 2 or in steps S9 to S11, S14, and S15 in FIG. 6. The client device 100 executes processing in FIG. 12 after step S7 in FIG. 2 or step S17 in FIG. 6.

Figure 12:
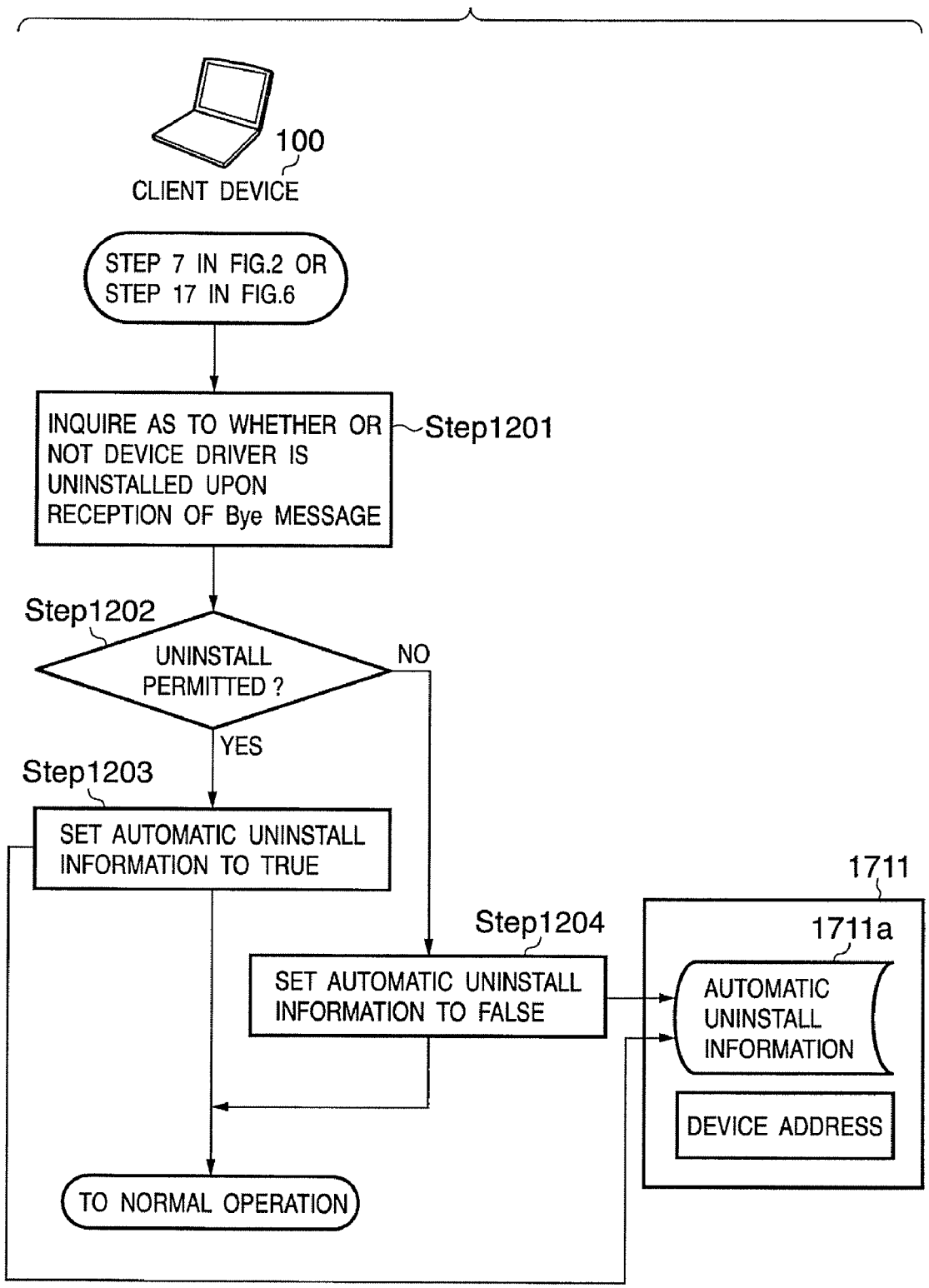
FIG. 12 is a flowchart showing the procedure after the plug-and-play processing for a network device according to the third embodiment.

FIG. 12 is a flowchart for explaining the control procedure immediately after the plug-and-play processing for a network device by the client device 100 in this embodiment.

The client 100 installs a device driver by the same plug-and-play processing for the network compatible device 200 as in FIG. 2 or by the same search processing for the network compatible device 200 as in FIG. 6.

Figure 16:
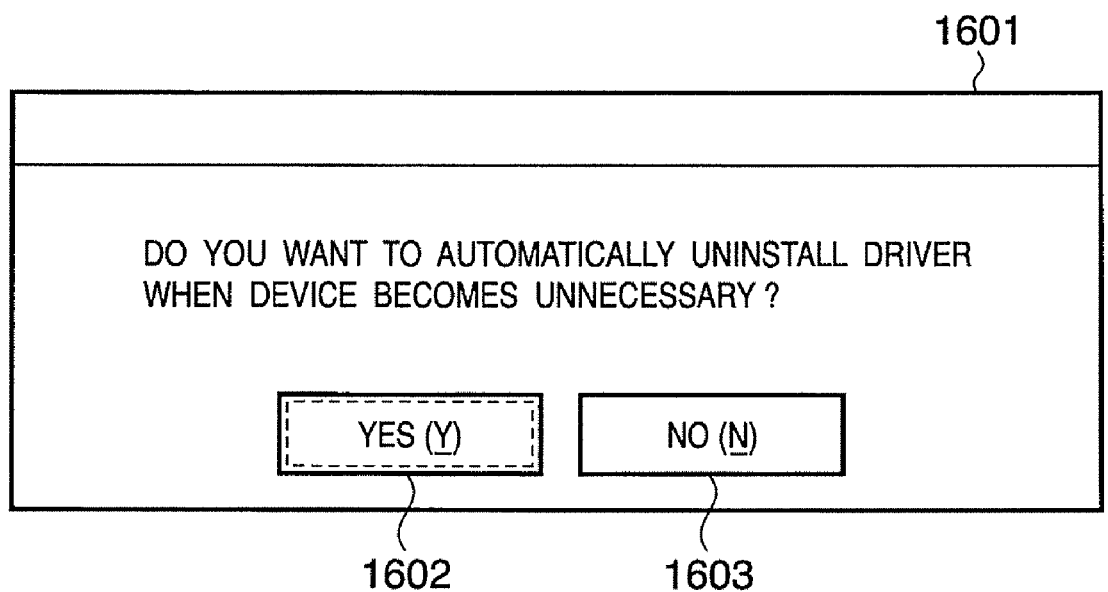
FIG. 16 shows an example of a dialog box used to confirm if a device driver is to be automatically uninstalled when a device becomes unnecessary.

After the device driver is installed, the plug-and-play controller 11 displays a dialog box 1601 (FIG. 16) as a user interface via the device driver manager 10 (step S1201). This dialog box is a user interface that inquires the user in advance to confirm whether or not the device driver is to be automatically uninstalled when the corresponding device becomes unnecessary. The client device 100 checks a button pressed by the user (step S1202). If it is determined that the user presses a "YES" button 1602, automatic uninstall information 1711a is set and saved as true. In this embodiment, the CPU 1701 saves this information in association with the device address of the device corresponding to the driver installed in the hard disk 1711 (step S1203). For example, the automatic uninstall information 1711a may be added as one item of the print queue information in FIG. 18. If it is determined that the user presses a "NO" button 1603, the automatic uninstall information 1711a is set and saved as false. In this embodiment, the CPU 1701 saves this information in association with the device address of the device corresponding to the driver installed in the hard disk 1711 (step S1204). The information saved in step S1203 or S1204 is saved in association with the device address in course. This information (flag) is referred to so as to confirm whether or not the device driver is to be automatically uninstalled when the device becomes unnecessary. In this way, the user selects whether or not the device driver is to be automatically uninstalled at the time of installation of the device driver, and the selection result is saved.

Figure 13:
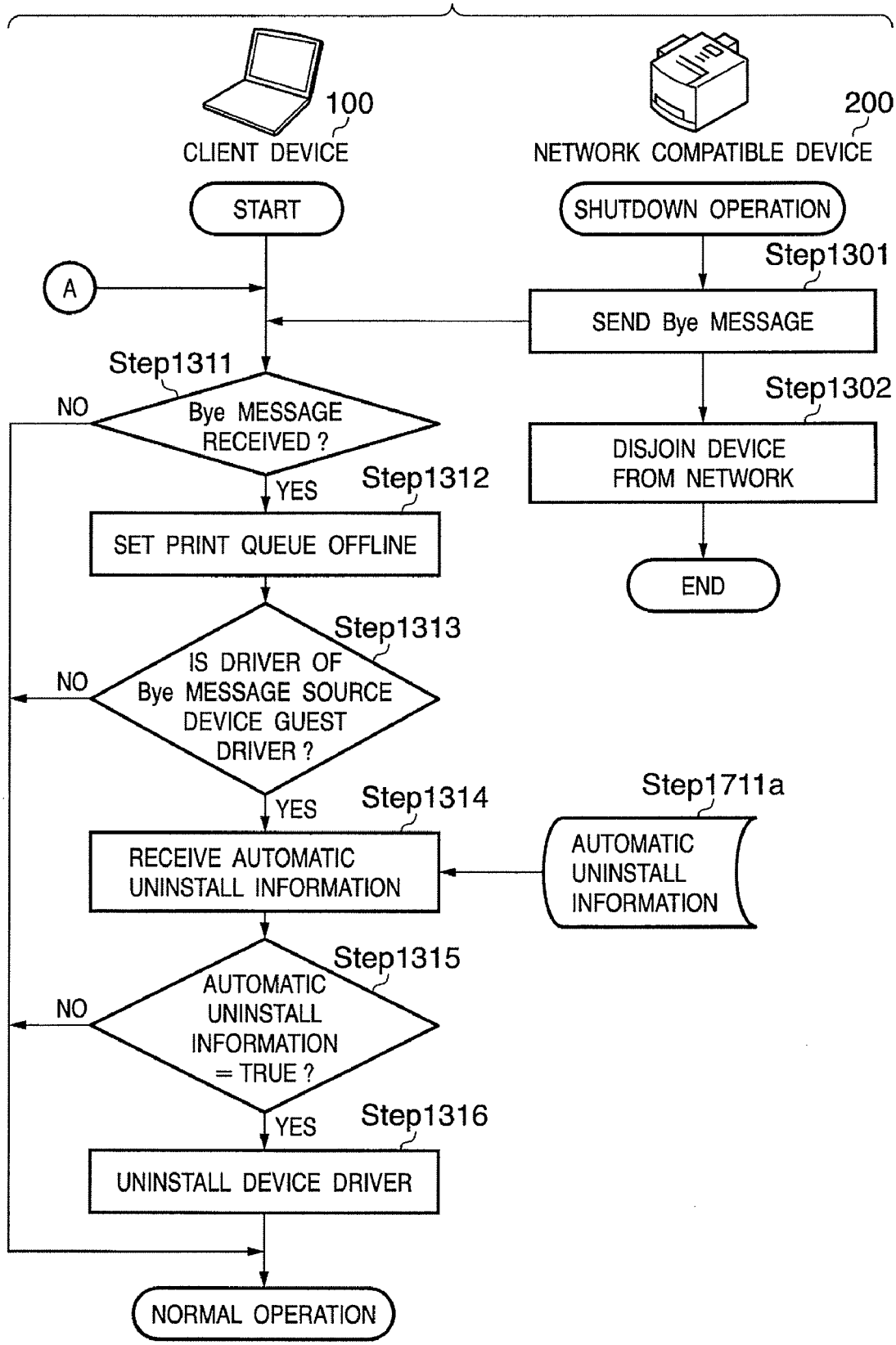
FIG. 13 is a flowchart showing the procedure of the control executed when a network compatible device disjoins from a network according to the third embodiment.

FIG. 13 is a flowchart showing the control procedure when a network device disjoins from the network in this embodiment.

Upon disjoining the network compatible device 200 from the network, the user performs, e.g., a shutdown operation. With this operation, when the network compatible device 200 disjoins from the network, the WSD module 21 requests the SOAP processor 20 to send a Bye message. The SOAP processor 20 generates a Bye message based on the WS-Discovery specification, and sends the generated message to a multicast address 239.255.255.250 via the protocol stack by multicast (step S1301). This processing is the same as that in step S18 in FIG. 9. The Bye message is described in XML-SOAP, and is the same as that shown in FIG. 10 in the above description.

The client device 100 receives the Bye message. The SOAP processor 6 is notified of the received Bye message via the TCP/UDP/IP protocol stack 4. The SOAP processor 6 parses the contents of the Bye message, and notifies the WSD module 8 of that result (step S1311). This processing is the same as that in step S19. The WSD module 8 notifies the plug-and-play controller 11 of the device address. Upon reception of the notification, the plug-and-play controller 11 searches the storage device for a print queue associated with the device address via the device driver manager 10, and sets the corresponding print queue in an offline state (step S1312). The search processing and offline processing are the same as those in step S20. Note that as a visual effect of the offline state, the icon of the print queue may be grayed out or set to be translucent, thus clearly informing the user of the offline state.

Furthermore, the device driver manager 10 checks if a device driver corresponding to the printer as the source of the Bye message is a guest device driver (step S1313). Note that the processing in step S1313 is the same as that in step S22 in FIG. 9. If it is determined that the device driver corresponding to the source device of the Bye message is a guest driver, the device driver manager 10 refers to the automatic uninstall information 1711a set in step S1203 or S1204 (step S1314). The device driver manager 10 checks the value of the automatic uninstall information 1711a with reference to that information saved in association with the address of the source device of the Bye message (step S1315). If the device driver manager 10 determines that the value of the automatic uninstall information 1711*a* is "TRUE", the plug-and-play controller 11 checks if the driver corresponding to the source device of the Bye message in step S1201 is a guest driver. If it is determined that the driver is a guest driver, the plug-and-play controller 11 uninstalls that device driver (step S1316).

The client device 100 repetitively executes the aforementioned control from step S1311 to step S1315. With this control, when the user permits the automatic uninstall processing of the device driver, the client device 100 can execute automatic uninstall processing of the device driver. The automatic uninstall permission can be set for each device. That is, the client device 100 registers automatic uninstall information indicating automatic uninstall of a device driver upon installing the device driver corresponding to the peripheral device. Upon reception of a network leaving message, the client device 100 refers to the registered automatic uninstall information. If information indicating automatic uninstall permission is registered, the client device 100 uninstalls the device driver corresponding to the peripheral device as the source of the Bye request. For this reason, the following setting can be made: even a device driver installed by the guest user, which corresponds to an important device and is to be left as needed, is not selected as a driver to be automatically uninstalled, and other device drivers are to be automatically uninstalled. That is, the advisability of the automatic uninstall processing in response to a Bye message of a given device as a trigger can be set for each device.

Fourth Embodiment

In the aforementioned first, second, and third embodiments, the starting point of the processing upon uninstalling a device driver by the client device 100 is reception of a Bye message sent from the network compatible device 200. However, the client device 100 may be temporarily suspended or shut down, and may not receive a Bye message. In such case, if the network compatible device 200 sends a Bye message, the client of the first, second, and third embodiments cannot execute automatic uninstall processing. Hence, an embodiment executed when the client device 100 cannot receive a Bye message will be described below.

The search function of the network compatible device. 200, practical means to implement Hello message response, and plug-and-play processing are the same as those in the first embodiment. The client device 100 executes processing in the procedures shown in the flowcharts of FIGS. 2 and 6. Up to this processing, installation of the device driver in the client device 100 is complete. The procedure executed when the client receives a Bye message from the network compatible device (printer) is one of the first to third embodiments. That is, this embodiment is applied to the client device in combination with one of the first to third embodiments.

Figure 14:
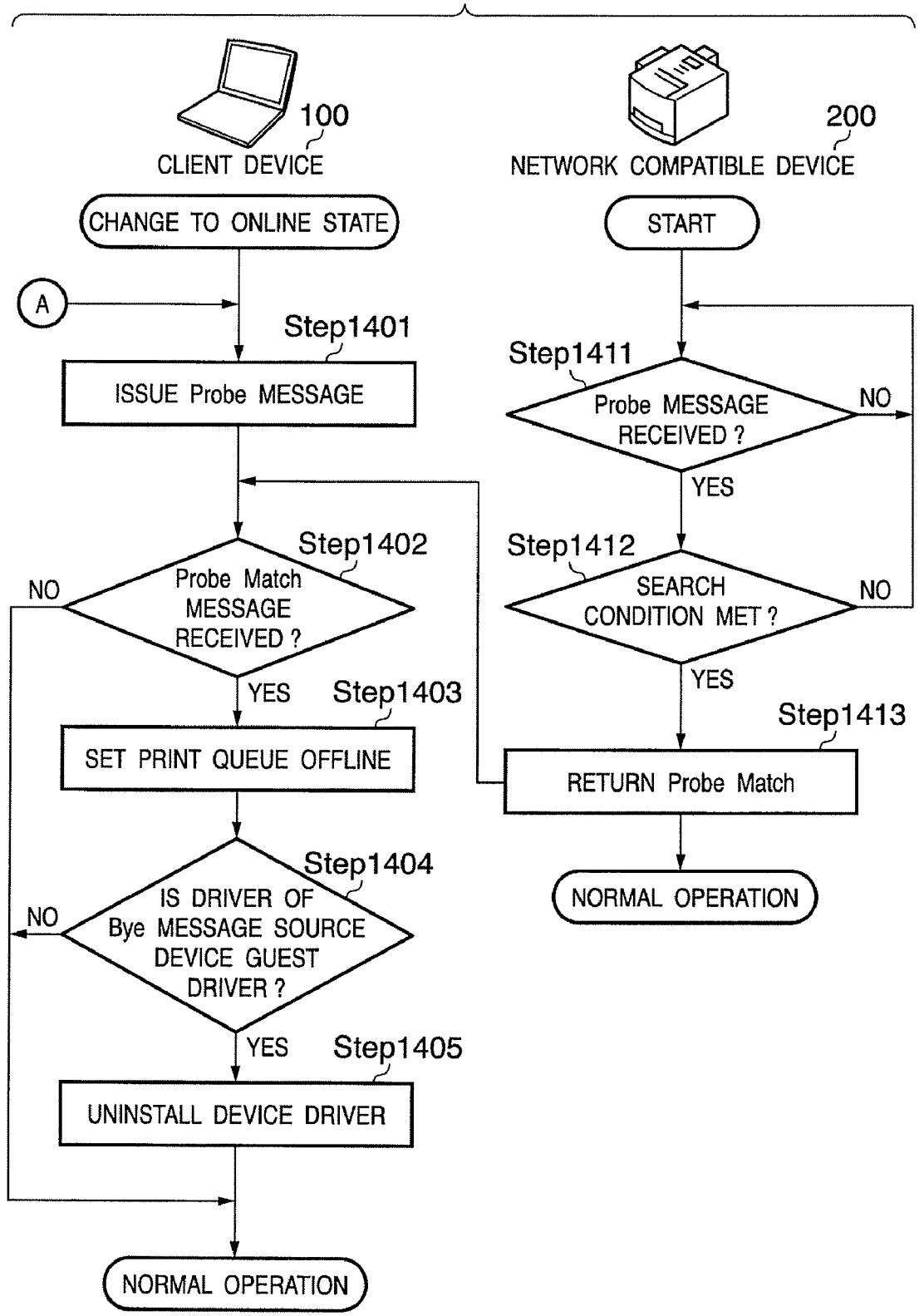
FIG. 14 is a flowchart showing the procedure of the control immediately after a client device returns to a receivable state of a Bye message according to the fourth embodiment.

Assume that the client device 100 cannot receive a Bye message from a device. For example, the client device 100 is temporarily suspended or is shut down and shifts to a state in which it cannot receive any Bye message. After that, the client device 100 returns to a normal state in which it can receive a Bye message again. FIG. 14 is a flowchart for explaining the procedure of processing executed when the client device 100 searches for a network compatible device which is ready to use on the network immediately after it returns to the state in which it can receive a Bye message in such situation.

The client device 100 returns to the state in which it can receive a Bye message when it resumes from the suspend state or its power switch is turned on. Immediately after the return, the utility 14 or application 15 of the client 100 requests the SOAP processor 6 to send a Probe message specified by the WS-Discovery specification. The SOAP processor 6 generates a Probe message based on the WS-Discovery specification, and sends the generated message to a multicast address 239.255.255.250 via the protocol stack by multicast (S1401). A device to be searched for by the Probe message is a printer in this embodiment.

When the network compatible device 200 receives the Probe message (step S1411), the SOAP processor 20 is notified of the received Probe message via the TCP/UDP/IP protocol stack 16. The SOAP processor 20 parses the contents of the Probe message, and notifies the WSD module 21 of that result. The WSD module 21 checks if the contents (device type) of the notified message match the functions provided by this network compatible device 200 (step S1412). If the WSD module 21 determines that the contents do not match, it ignores that information (step S1412—NO). If it is determined in step S1412 that the contents do not match, the network compatible device 200 does not issue any Probe Match response.

On the other hand, if the WSD module 21 determines that the contents match, it requests the SOAP processor 20 to issue a Probe Match message. The SOAP processor 20 generates a Probe Match message based on the WS-Discovery specification, and sends the generated message to the client via the protocol stack by unicast (step S1413). The Probe Match message is described in XML-SOAP, and is the same as that shown in FIG. 8 in the above description.

After the client 100 sends the Probe message, it waits for reception of a Probe Match message to that Probe message for a predetermined period of time (step S1402). If the client 100 receives the Probe Match message within the predetermined period of time, it can be determined that a device as the source of the message is connected to the network. That is, it is checked based on the presence/absence of the received Probe Match message if the network compatible device 200 has disjoined from the network.

That is, upon reception of the Probe Match message by the client device 100 (step S1402—Yes), the SOAP processor 6 is notified of that message via the TCP/UDP/IP protocol stack. The SOAP processor 6 parses the contents of the Probe Match message, and notifies the WSD module 8 of that result.

The WSD module 8 notifies the plug-and-play controller 11 of identification information (e.g., address) of the source device of the Probe Match message received by the client device 100 within the predetermined period of time. Upon reception of the device address, the plug-and-play controller 11 searches the print queue information 1801 for a print queue which does not correspond to the notified address (step S1402). The plug-and-play controller 11 sets the print queue discovered as a result of the search in an offline state (step S1403). That is, the plug-and-play controller 11 specifies a network compatible device which did not send any Probe Match message, and sets a corresponding print queue in an offline state. Note that as a visual effect of the offline state, the icon of the print queue may be grayed out or set to be translucent, thus clearly informing the user of the offline state.

The device driver manager 10 checks if a device driver corresponding to the printer as the source of the Bye message is a guest device driver (step S1404). Note that the processing in step S1404 is the same as that in step S22 in FIG. 9. If it is determined that the device driver corresponding to the source device of the Bye message is a guest driver, the plug-and-play controller 11 uninstalls the driver corresponding to the offline print queue (step S1405). Since the driver is uninstalled in step S1405, step S1403 can be omitted.

As described above, the client device 100 executes steps S1401 to S1404. In this way, even when the client device 100 cannot receive any Bye message sent from the network compatible device 200, it can automatically uninstall a device driver corresponding to a device which is not connected. That is, the client device 100 sends a Probe message that inquires about the presence of a peripheral device which meets predetermined conditions on the network when it is connected to the network. The client device 100 receives a response to the Probe message. The client device 100 uninstalls a device driver corresponding to a peripheral device which has already been installed and does not return any response to the Probe message.

As described above, software, which is installed in an information processing apparatus such as a notebook type personal computer, PDA, portable phone, or the like that is used by a guest user, by the network PnP function can be automatically uninstalled if it becomes unnecessary. As a result, software such as a driver, utility, application, and the like, which can be actually used, remains, thus greatly improving use convenience. Also, the hardware resources such as a memory and the like of the information processing apparatus can be prevented from being wasted by software such as a driver, utility, application, and the like, which can no longer be used by the user.

Other Embodiments

The aforementioned embodiments adopt the protocol defined by WS-Discovery as the network device search means and means for notifying that a network device joins the network. However, the present invention is not limited to such specific protocol, and can be practiced by using, e.g., SSDP (Simple Service Discovery Protocol) specified by UPnP(tm) v1, GENA (General Event Notification Architecture), and the like. As the search protocol of a network device, any other protocols can be applied as long as they can acquire the address used to acquire attribute information of the network device and a destination used to control the network device.

The aforementioned embodiments implement communication media using Ethernet®, WiFi® (wireless communication: IEEE802.11a/b/g), and Bluetooth®. However, the present invention can be applied to either a local I/O or network as long as a communication medium can discover a device, and can notify that the device begins to execute functions.

The aforementioned embodiments have explained the install and uninstall processes of a driver corresponding to the discovered network device. In addition, the present invention can be applied to automatic install and uninstall processes of a utility, application, and the like required to use and control the network device.

The aforementioned embodiments have explained an implementation example for a printer as a network device. However, the present invention can be applied to any other devices such as a scanner, storage device, and the like as long as they can be used and controlled via communication media.

In the aforementioned embodiments, each embodiment may be practiced solely, and a plurality of embodiments may be practiced in combination.

In the aforementioned embodiments, when the network device is a printer, the device driver is uninstalled. By contrast, not only the printer driver is uninstalled to the letter, but also the print queue may be deleted but the printer driver may not be uninstalled. In this way, the processing load can be reduced, and an identical driver need not be installed again.

In the aforementioned embodiments, software such as a driver, application, utility, and the like required to control the network device by the client device 100 is normally held on the memory or hard disk. In addition, the present invention can be applied to a case wherein such software is held on the network device, a case wherein the software is held on a third server, and the like.

In the aforementioned embodiments, an embodiment in the TCP/IP network using the DHCP Enabled, IP Address, Subnet Mask, Default Gateway, DNS Server, and DHCP Server as information used to identify a network environment has been exemplified. However, the present invention is not limited to this, and can be applied to any other information which can be uniquely identified from another network environment.

The respective processing functions of each of the client device 100 and network compatible device 200 in the aforementioned embodiments are implemented when the corresponding CPU (central processing unit) reads out programs required to implement these processing functions from a memory and executes them. However, the present invention is not limited to this, and all or some of the processing functions may be implemented by dedicated hardware. The aforementioned memory comprises a nonvolatile memory such as a magneto-optical disk device, flash memory, or the like. Furthermore, the memory may comprise a read-only recording medium such as a CD-ROM, a volatile memory other than a RAM, or a computer readable & writable recording medium as a combination of them.

The respective processes may be attained by recording programs required to implement the functions in each of the client device 100 and network compatible device 200 in a computer readable recording medium, and loading the recorded programs onto a computer when they are executed. Note that the "computer" includes an OS and hardware such as peripheral devices and the like. More specifically, a program read out from the recording medium is written in a memory of a function extension board or a function extension unit, which is inserted in or connected to the computer. After that, a CPU or the like of the function extension board or function extension unit executes some or all of actual processes based on an instruction of that program, and these processes implement the functions of the aforementioned embodiments. The present invention also includes such case.

The "computer readable recording medium" means removable media such as a flexible disk, magneto-optical disk, ROM, CD-ROM, and the like, and a storage device such as a hard disk or the like incorporated in a computer system. Furthermore, the "computer readable recording medium" includes a volatile memory (RAM) in a computer system which serves as a server or client upon transmitting a program via a network such as the Internet or the like or a communication line such as a telephone line or the like. In this way, the recording medium includes a medium that holds a program for a predetermined period of time.

The program may be transferred from a computer system which stores this program in a storage device or the like to another computer system via a transfer medium or a transfer wave in the transfer medium. Note that the "transfer medium" that transfers the program means a medium having a function of transferring information like a network (communication network) such as the Internet or the like or a communication line such as a telephone line or the like.

The program may be used to implement some of the aforementioned functions. Furthermore, the program may be a so-called difference file (difference program) which can implement the aforementioned functions as a combination of programs already recorded in a computer system.

A program product such as the computer readable recording medium which records the program and the like can be applied as an embodiment of the present invention. The program, recording medium, transfer medium, and program product are included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-320010, filed Nov. 2, 2005, which is hereby incorporated by reference herein in its entirety.

What is claimed is:

1. An information processing apparatus connected to a peripheral device, said apparatus comprising:
   a reception unit adapted to receive a network leaving message from the peripheral device, the network leaving message indicating removal of the peripheral device;
   a storage device for storing information for identifying a device driver installed after login of a temporary user as a guest device driver;
   a first determination unit adapted to determine, based on the information stored in said storage device, whether or not a device driver corresponding to the peripheral device as a source of the network leaving message received by said reception unit is the guest device driver; and
   an uninstall unit adapted to, when said first determination unit determines that the device driver corresponding to the peripheral device as the source of the network leaving message is the guest device driver, uninstall the device driver corresponding to the peripheral device as the source of the network leaving message while the temporary user is still logged in.

2. The apparatus according to claim 1, further comprising a user determination unit adapted to determine whether or not a login user is a temporary user.

3. The apparatus according to claim 1, further comprising:
   an inquiry unit adapted to inquire as to whether or not the device driver corresponding to the peripheral device as the source of the network leaving message is uninstalled in response to reception of the network leaving message by said reception unit,
   wherein said uninstall unit uninstalls the device driver when uninstallation is designated in response to the inquiry by said inquiry unit.

4. The apparatus according to claim 1, further comprising:
   a registration unit adapted to register automatic uninstall information indicating automatic uninstall processing of a device driver upon installing the device driver corresponding to a peripheral device,
   wherein said uninstall unit refers to the automatic uninstall information registered by said registration unit upon reception of the network leaving message by said reception unit, and uninstalls the device driver when the automatic uninstall information indicating permission of the automatic uninstall processing is registered.

5. The apparatus according to claim 1, further comprising:
   a unit adapted to transmit a probe message that inquires about the presence of a peripheral device that meets a predetermined condition on a network when said information processing apparatus is connected to the network; and
   a unit adapted to receive a response to the probe message, wherein said uninstall unit uninstalls a device driver which has already been installed in said information processing apparatus and corresponds to a peripheral device which does not return any response to the probe message.

6. A method of controlling an information processing apparatus connected to a peripheral device, said method comprising:
   a reception step of receiving a network leaving message from the peripheral device, the network leaving message indicating removal of the peripheral device, wherein the apparatus has a storage unit for storing information for identifying a device driver installed after login of a temporary user as a guest device driver;
   a first determination step of determining, based on the information stored in the storage unit, whether or not a device driver corresponding to the peripheral device as a source of the network leaving message received in the reception step is the guest device driver; and
   an uninstall step of, when it is determined in the first determination step that the device driver corresponding to the peripheral device as the source of the network leaving message is the guest device driver, uninstalling the device driver corresponding to the peripheral device as the source of the network leaving message while the temporary user is still logged in.

7. The method according to claim 6, further comprising a user determination step of determining whether or not a login user is a temporary user.

8. The method according to claim 6, further comprising:
   an inquiry step of inquiring as to whether or not the device driver corresponding to the peripheral device as the source of the network leaving message is uninstalled in response to reception of the network leaving message in the reception step,
   wherein the uninstall step includes a step of uninstalling the device driver when uninstallation is designated in response to the inquiry in the inquiry step.

9. The method according to claim 6, further comprising:
   a registration step of registering automatic uninstall information indicating automatic uninstall processing of a device driver upon installing the device driver corresponding to a peripheral device,
   wherein the uninstall step includes a step of referring to the automatic uninstall information registered in the registration step upon reception of the network leaving message in the reception step, and uninstalling the device driver when the automatic uninstall information indicating permission of the automatic uninstall processing is registered.

10. A program, stored on a non-transitory computer-readable storage medium, which makes a computer connected to a peripheral device execute a control method, said method comprising:
    a reception step of receiving a network leaving message from the peripheral device, the network leaving message indicating removal of the peripheral device, wherein the computer has a storage unit for storing information for identifying a device driver installed after login of a temporary user as a guest device driver;
    a first determination step of determining, based on the information stored in the storage unit, whether or not a device driver corresponding to the peripheral device as a source of the network leaving message received in the reception step is the guest device driver; and
    an uninstall step of, when it is determined in the first determination step that the device driver corresponding to the peripheral device as the source of the network leaving message is the guest device driver, uninstalling the device driver corresponding to the peripheral device as the source of the network leaving message while the temporary user is still logged in.

11. The program according to claim 10, wherein said method further comprises a user determination step of determining whether or not a user who has logged in the computer is a temporary user.

12. The program according to claim 10, wherein said method further comprises:
   an inquiry step of inquiring as to whether or not the device driver corresponding to the peripheral device as the source of the network leaving message is uninstalled in response to reception of the network leaving message in the reception step,
   wherein the uninstall step includes a step of uninstalling the device driver when uninstallation is designated in response to the inquiry in the inquiry step.

13. The program according to claim 10, wherein said method further comprises:
   a registration step of registering automatic uninstall information indicating automatic uninstall processing of a device driver upon installing the device driver corresponding to a peripheral device,
   wherein the uninstall step includes a step of referring to the automatic uninstall information registered in the registration step upon reception of the network leaving message in the reception step, and uninstalling the device driver when the automatic uninstall information indicating permission of the automatic uninstall processing is registered.

\* \* \* \* \*